(12) United States Patent
Azibert et al.

(10) Patent No.: US 12,331,836 B2
(45) Date of Patent: Jun. 17, 2025

(54) SYSTEM AND METHOD FOR AUTOMATICALLY ENERGIZING PACKING MATERIAL WITH A PACKING LOADING ASSEMBLY

(71) Applicant: A.W. CHESTERTON COMPANY, Groveland, MA (US)

(72) Inventors: Henri Vincent Azibert, Windham, NH (US); Robert James Powers, Salem, MA (US); Michael P. Grimanis, Wayland, MA (US); Philip Michael Mahoney, Jr., Roslindale, MA (US)

(73) Assignee: A. W. CHESTERTON COMPANY, Groveland, MA (US)

( * ) Notice: Subject to any disclaimer, the term of this patent is extended or adjusted under 35 U.S.C. 154(b) by 0 days.

(21) Appl. No.: 18/499,889

(22) Filed: Nov. 1, 2023

(65) Prior Publication Data
US 2024/0060565 A1     Feb. 22, 2024

Related U.S. Application Data

(63) Continuation-in-part of application No. 16/850,688, filed on Apr. 16, 2020, now abandoned.
(Continued)

(51) Int. Cl.
*F16J 15/40*     (2006.01)
*F16J 15/00*     (2006.01)
(Continued)

(52) U.S. Cl.
CPC .............. *F16J 15/40* (2013.01); *F16J 15/002* (2013.01); *F16J 15/067* (2013.01); *F16J 15/14* (2013.01);
(Continued)

(58) Field of Classification Search
CPC .......... F16J 15/40; F16J 15/185; F16J 15/067; F16J 15/002; F16J 15/14; F16J 15/3448;
(Continued)

(56) References Cited

U.S. PATENT DOCUMENTS 3,434,728 A     3/1969   Soldato
3,471,156 A  *  10/1969  Burns ..................... E21B 33/08
                                                    277/332
(Continued)

FOREIGN PATENT DOCUMENTS

DE     9116517 U1    1/1993
GB     2026628 A     2/1980
(Continued)

OTHER PUBLICATIONS

International Preliminary Report on Patentability, PCT/US2020/028494, dated Sep. 28, 2021, 9 pages.
(Continued)

*Primary Examiner* — Minh Q Le
(74) *Attorney, Agent, or Firm* — Nelson Mullins Riley & Scarborough LLP; Anthony A. Laurentano

(57) ABSTRACT

A system for regulating an axial biasing force applied to a stacked set of packing elements mounted within stationary equipment, comprising a packing loading assembly for sealing a process fluid within the stationary equipment and for applying the axial biasing force to the packing elements via a pressurized fluid from a pressure regulator. The packing loading assembly includes a gland element for mounting to the stationary equipment by a plurality of gland bolts, and an external actuation subsystem for coupling to at least one of the plurality of gland bolts for applying an axial actuation force directly to the gland element in response to the
(Continued)

pressurized fluid. The gland element in response to the axial actuation force applies the axial biasing force to the packing elements.

21 Claims, 18 Drawing Sheets

Related U.S. Application Data

(60) Provisional application No. 63/421,300, filed on Nov. 1, 2022, provisional application No. 62/835,966, filed on Apr. 18, 2019.

(51) Int. Cl.
| | |
|---|---|
| F16J 15/06 | (2006.01) |
| F16J 15/14 | (2006.01) |
| F16J 15/18 | (2006.01) |
| F16J 15/34 | (2006.01) |
| F16J 15/46 | (2006.01) |
| F16J 15/56 | (2006.01) |
| F16K 31/02 | (2006.01) |
| F16K 31/42 | (2006.01) |
| G05D 16/00 | (2006.01) |
| G05D 16/20 | (2006.01) |

(52) U.S. Cl.
CPC .......... *F16J 15/185* (2013.01); *F16J 15/3448* (2013.01); *F16J 15/3492* (2013.01); *F16J 15/46* (2013.01); *F16J 15/56* (2013.01); *F16K 31/02* (2013.01); *F16K 31/42* (2013.01); *G05D 16/024* (2019.01); *G05D 16/20* (2013.01)

(58) Field of Classification Search
CPC .......... F16J 15/3492; F16J 15/46; F16J 15/56; F16K 31/02; F16K 31/42; G05D 16/024; G05D 16/20
USPC .................................................. 277/308, 337
See application file for complete search history.

(56) References Cited

U.S. PATENT DOCUMENTS

| | | | |
|---|---|---|---|
| 3,955,822 A | 5/1976 | Irby | |
| 4,168,936 A | 9/1979 | Scheller et al. | |
| 4,289,317 A | 9/1981 | Kuc | |
| 4,291,768 A | 9/1981 | Diehl | |
| 4,328,973 A * | 5/1982 | Delbridge | F16J 15/186 277/408 |
| 5,056,757 A | 10/1991 | Wood | |
| 5,056,758 A | 10/1991 | Bramblet | |
| 5,209,497 A | 5/1993 | Von Bergen et al. | |
| 5,213,340 A | 5/1993 | Azibert et al. | |
| 5,267,736 A | 12/1993 | Pietsch et al. | |
| 5,316,319 A * | 5/1994 | Suggs | F04D 29/102 411/917 |
| 5,356,157 A | 10/1994 | Houston | |
| 5,365,971 A * | 11/1994 | Bergamini | F16K 41/003 251/355 |
| 5,642,892 A | 7/1997 | Burgess | |
| 6,167,959 B1 * | 1/2001 | Bassinger | E21B 33/08 166/84.2 |
| 6,325,387 B2 | 12/2001 | Shoemaker | |
| 6,394,461 B1 | 5/2002 | Henderson | |
| 6,502,827 B1 | 1/2003 | Toner | |
| 6,673,201 B2 * | 1/2004 | Vogel | D21C 7/00 162/57 |
| 11,662,022 B2 * | 5/2023 | Rhee | H01L 21/687 277/302 |
| 2013/0061954 A1 | 3/2013 | Giove et al. | |
| 2016/0077530 A1 | 3/2016 | Moran et al. | |
| 2017/0292606 A1 * | 10/2017 | Bergamini | F16K 41/04 |
| 2018/0051684 A1 * | 2/2018 | Bergamini | F16J 15/56 |
| 2020/0332895 A1 | 10/2020 | Azibert et al. | |
| 2022/0221059 A1 * | 7/2022 | Matsuoka | F16J 15/3204 |
| 2022/0355528 A1 * | 11/2022 | Tieben | B29C 48/397 |
| 2024/0159229 A1 * | 5/2024 | Lagler | F04B 53/144 |

FOREIGN PATENT DOCUMENTS

| | | |
|---|---|---|
| GB | 2256238 A | 12/1992 |
| WO | 2008/028235 A1 | 3/2008 |

OTHER PUBLICATIONS

International Search Report and Written Opinion, PCT/US2020/028494, dated Jul. 13, 2020, 13 pages.
International Search Report and Written Opinion, PCT/US2023/078374, dated Jan. 29, 2024, 14 pages.

* cited by examiner

SYSTEM AND METHOD FOR AUTOMATICALLY ENERGIZING PACKING MATERIAL WITH A PACKING LOADING ASSEMBLY

RELATED APPLICATION

The present application claims priority to U.S. provisional patent application Ser. No. 63/421,300, filed on Nov. 1, 2022, and entitled SYSTEM AND METHOD FOR AUTOMATICALLY ENERGIZING PACKING MATERIAL WITH A PACKING LOADING ASSEMBLY, and is a continuation-in-part patent application of U.S. Ser. No. 16/850,688, filed on Apr. 16, 2020, and entitled SYSTEM AND METHOD FOR AUTOMATICALLY ENERGIZING PACKING MATERIAL WITH A PACKING LOADING ASSEMBLY, which in turn claims priority to U.S. provisional patent application Ser. No. 62/835,966, filed on Apr. 18, 2019, and entitled METHOD AND SYSTEM FOR AUTOMATICALLY ENERGIZING PACKING MATERIAL IN A MECHANICAL SEAL, wherein the contents of all of the foregoing are herein incorporated by reference.

BACKGROUND OF THE INVENTION

The present invention relates to packing material in a stationary equipment, and more specifically relates to a system and method of automatically energizing the packing material by applying a controllable axial load.

In some mechanical fields, it is important that a fluid tight seal be effected between adjacent pieces of equipment. For example, one common application of sealing technology relates to a spinning or rotating shaft having a process medium or fluid housed at one end. In such a situation, it is typically desirable to prevent the process fluid from leaking from around the shaft. Accordingly, as is known, stationary equipment, such as a stuffing box, is employed to surround the shaft. The stuffing box can employ a packing material, oftentimes referred to as a compression packing seal, which is wrapped around the rotating shaft and provides an interface and sealing surface between the rotating shaft and the stuffing box. The compression packing seal is typically composed of a series of stacked, axially abutting packing rings. A mechanical seal can also be employed to help effectuate shaft sealing by being mounted to the stuffing box instead of the packing material or alternatively the packing material can be incorporated into the mechanical seal.

The compression packing seal may be in the form of a braided packing material that is commonly square or round when viewed in cross section, although the compression packing seal may be provided in a variety of cross-sectional shapes. The compression packing seal may be cut to an appropriate size and wrapped around the shaft to form a ring. Multiple packing rings may be provided along the length of the shaft in order to provide a seal around the shaft. Suitable structure, such as a packing gland, can be used to secure and compress the compression packing rings inside the stuffing box. As the packing rings are compressed, the rings expand radially to create a seal between the rotating shaft and the stationary stuffing box. The seal formed by the packing rings forms a fluid seal and maintains a pressure boundary between the fluid inside the stuffing box and the external atmosphere.

A drawback of the conventional mounting techniques for the packing material is that the sealing ability of the packing material degrades over time. As such, an ever-increasing amount of compression must be applied to the packing material in order to maintain the fluid seal.

In order to address this issue, conventional systems try to apply an axial force to the packing material to form and maintain the fluid seal between the stuffing box and the shaft. According to one conventional technique, known structure, such as gland bolts, can be used to apply the axial loading force to the packing material. As the packing material wears over time, however, the axial load on the packing material decreases and leakage occurs, so gland bolt adjustments are required on a regular basis. According to another conventional technique, Belleville washers or conical washers, or a secondary seal assembly, can be used to apply an axial force to the packing material. However, the axial load decreases as the springs elongate, and axial travel of the springs is limited.

SUMMARY OF THE INVENTION

It is an object of the present invention to provide a shaft seal apparatus that allows gland packings to maintain sealing performance over time without requiring frequent adjustments or tightening of the sealing material. Another object of the present invention is to provide a remotely adjustable means or mechanism for applying a substantially uniform and precise axial load to the packing material, which can compensate for wear of the packing material over time.

The pressure regulating system of the present invention can employ any selected combination of any of the foregoing elements, units, assemblies, or subassemblies.

The present invention is directed to a pressure regulating system for use with a packing loading assembly and stationary equipment for applying a substantially uniform force or load to a stacked set of packing elements. The force applied to the packing elements can be regulated or controlled in real time and in a remote manner. The packing loading assembly includes a gland and an axially movable follower element that can be energized by pressurized fluid to move between a pre-loaded position where the follower element does not apply an axial load to the packing elements to a loaded position where the follower element applies the axial load to the packing elements. The axial load energizes the packing elements to form a fluid tight seal between the shaft or associated sleeve element and the packing elements, as well as between the packing elements and selected surfaces of the stationary equipment.

According to one practice, the present invention is directed to a pressure regulating system for stationary equipment employing a stacked set of packing elements, comprising a fluid source for supplying a source of fluid, a pressure regulator for regulating the pressure of the fluid to form a pressurized fluid, and a packing loading assembly for sealing a process fluid within the stationary equipment and for applying an axial loading force to the packing elements via the pressurized fluid from the pressure regulator. The pressure regulator has an inlet for receiving the fluid from the fluid source and an outlet for supplying the pressurized fluid.

The pressure regulating system can also include a fluid regulator disposed between the fluid source and the pressure regulator for regulating the fluid flow therebetween. The fluid regulator can be a check valve.

The present invention is directed to a system for regulating an axial biasing force applied to a stacked set of packing elements mounted within stationary equipment, comprising a fluid source for supplying a source of fluid, a pressure regulator for regulating the pressure of the fluid to form a pressurized fluid, and a packing loading assembly for sealing a process fluid within the stationary equipment and for applying the axial biasing force to the packing elements via the pressurized fluid from the pressure regulator. The packing loading assembly includes a gland element for mounting to the stationary equipment by a plurality of gland bolts, and an external actuation subsystem for coupling to at least one of the plurality of gland bolts for applying an axial actuation force directly to the gland element in response to the pressurized fluid, and wherein the gland element in response to the axial actuation force applies the axial biasing force to the packing elements.

The gland element can include a top portion having a top surface for contacting a bottom surface of the external actuation subsystem and a bottom flange portion that has a surface that contacts an axially outermost one of the packing elements for applying the axial biasing force thereto. The external actuation subsystem can include a top housing component and a bottom housing component that is separable from and axially movable relative to the top housing component. The top housing component has a main body having a central region that is shaped to accommodate the gland bolt and is disposed between opposed first and second end regions, and the first end region has a first retainer aperture formed therein for seating a first retainer element and the second end region has a second retainer aperture formed therein for seating a second retainer element.

The external actuation subsystem can also include first and second plug elements for coupling to the main body of the top housing component, wherein each of the first and second plug elements includes a groove formed in a peripheral outer surface thereof for seating a plug sealing element. The first plug element is coupled to a bottom surface of the first end region by the first retainer element and the second plug element is coupled to a bottom surface of the second end region by the second retainer element. The bottom housing component can include a first chamber portion, a second chamber portion, and a central portion disposed between the first and second chamber portions. The first chamber portion has a first chamber formed therein for seating a first actuation element and the second chamber portion has a second chamber formed therein for seating a second actuation element.

The first actuation element can have a first central cavity formed therein that is sized and configured for seating the first plug element and a first groove formed in a peripheral outer surface for seating a first sealing element. The second actuation element can have a second central cavity formed therein that is sized and configured for seating the second plug element and a second groove formed in a peripheral outer surface for seating a second sealing element. The first plug element couples the first actuation element to the top housing component when the first plug element is disposed within the central cavity of the first actuation element, and the second plug element couples the second actuation element to the top housing component when the second plug element is disposed within the central cavity of the second actuation element. According to one embodiment, each of the first and second chambers has an inner wall and a floor, and the first sealing element of the first actuation element contacts the inner wall of the first chamber to form a fluid-tight seal between the first chamber and the first actuation element, and the second sealing element of the second actuation element contacts the inner wall of the second chamber to form a fluid-tight seal between the second chamber and the second actuation element. Still further, each of the first and second chamber portions of the bottom housing component can have a fluid port formed therein for receiving the pressurized fluid, such that when the pressurized fluid is introduced into the first and second chambers, the pressurized fluid moves the bottom housing component axially away from the top housing component and towards the gland element to apply the axial actuation force thereto.

The gland bolt has a bolt shaft and a bolt head, and the central region of the top housing component has a fastener-receiving aperture formed therein for receiving the bolt shaft and wherein the bolt head secures the external actuation subsystem to the gland element. The external actuation subsystem is movable between a preloaded position where the external actuation subsystem does not fully apply the axial actuation force to the gland element, and a loaded position where the external actuation subsystem applies the axial actuation force to the gland element. That is, the external actuation subsystem is movable between a preloaded position where the bottom housing component does not fully apply the axial actuation force to the gland element, and a loaded position where the bottom housing component axially move away from the top housing component to apply the axial actuation force to the gland element.

According to a second embodiment, the external actuation subsystem can be configured to move axially along the gland bolt and can include a top housing component and a bottom housing component that are coupled together. The gland bolt can have a bolt head and a bolt shaft, and the bottom housing component can have a chamber formed therein having a sidewall and a floor. The floor portion of the chamber can have a central opening formed therein for seating the bolt shaft and the bolt head is sized and configured seating within the chamber. The external actuation subsystem is movable along the bolt shaft between a preloaded position where the bolt head is disposed adjacent the floor of the bottom housing element and a loaded position where the bolt head is positioned adjacent the top housing component.

The bolt head can have a peripheral outer surface having a groove formed therein for seating a bolt sealing element, and the bottom housing component can be sized and configured such that the bolt sealing element is disposed in fluid sealing engagement with the sidewall of the chamber. The central opening of the floor portion of the chamber can have a groove formed therein for seating a shaft sealing element, and the shaft sealing element can engage with the shaft of the gland bolt to form a fluid tight seal. Further, the bottom housing element has a fluid port formed therein for communicating the pressurized fluid with the chamber for moving the external actuation subsystem between the preloaded and loaded positions. The bottom housing component can also have an anti-rotation element mounted on a bottom surface thereof for coupling to the gland element. The anti-rotation element helps prevents rotation of the external actuation subsystem relative to the gland element during use.

The packing loading assembly can include a follower element movable in an axial direction, and a gland for housing the follower element. The gland comprises a main body having an upper surface, an opposed bottom surface and a side surface, a plurality of fastener-receiving apertures formed in the main body for seating a fastening element, a gland channel formed in the bottom surface of the main body forming a gland pressure chamber, and a fluid supply port formed in the side surface and fluidly communicating with the gland channel. The gland channel comprises a bottom wall surface and opposed first and second side wall surfaces, and a sealing channel formed in each of the opposed first and second side wall surfaces for seating a sealing element. The follower element comprises a first end having a bucket-like structure and an opposed second end having a stem-like structure, wherein the bucket-like structure has a generally U-shaped body having opposed first and second side walls and a bottom wall forming a pressure chamber. The stem-like structure has a foot portion at a terminal end thereof for contacting an axially outermost one of the plurality of packing elements.

The bucket-like structure of the follower element is sized and configured for seating at least partly within the gland channel of the gland. Further, the follower element is movable between a first pre-loaded position where follower element is disposed in an axially outermost position and a second loaded position where the follower element moves axially inwardly, and the foot portion of the follower element contacts the axially outermost one of the plurality of packing elements and applies a loading force thereto.

According to another aspect, the gland channel of the gland has opposed side walls that are radially separated relative to each other and are connected by a bottom wall, and wherein the movable follower element is configured to move between a first pre-loaded position where the bucket-like structure of the follower element is disposed in the gland channel and where a top surface of the bucket-like structure contacts the bottom wall of the gland channel, and a second loaded position where the follower element moves axially inwardly and the top surface of the bucket-like structure is axially separated from the bottom wall surface of the gland channel. The gland pressure chamber of the gland and the pressure chamber of the follower element cooperate to form a pressurized chamber for selectively moving the follower element in an axial direction as a function of the pressure of the fluid within the pressurized chamber.

The system can also include an electronic device for communicating with and controlling the pressure regulator so as to control the pressure of the pressurized fluid exiting the outlet and conveyed to the packing loading assembly.

According to another practice, the present invention is directed to a packing loading assembly for mounting to stationary equipment employing a stacked set of packing elements, comprising a gland and a follower element. The gland includes a main body having an upper surface, an opposed bottom surface and a side surface, a plurality of fastener-receiving apertures formed in the main body for seating a fastening element, a gland channel formed in the bottom surface of the main body forming a gland pressure chamber, and a fluid supply port formed in the side surface and fluidly communicating with the channel. The follower element can include a first end having a bucket-like structure having a generally U-shaped body having opposed first and second side walls and a bottom wall forming a chamber, and an opposed second end having a stem-like structure, having a foot portion at a terminal end thereof for contacting an axially outermost one of the packing elements.

The gland pressure chamber and the chamber of the bucket-like structure are fluidly coupled so as to form a pressurized chamber for axially moving the follower element between a first pre-loaded position and a second loaded position. Further, the gland channel has first and second wall surfaces that are radially spaced apart and a bottom wall surface that is connected to the first and second wall surfaces. When the follower element is disposed in the first pre-loaded position, the bucket-like structure is disposed within the gland channel and a top surface of the bucket-like structure contacts the bottom wall surface of the gland channel. When the follower element is disposed in the second loaded position, the top surface of the bucket-like structure is radially separated from the bottom wall surface of the gland channel.

BRIEF DESCRIPTION OF THE DRAWINGS

These and other features and advantages of the present invention will be more fully understood by reference to the following detailed description in conjunction with the attached drawings in which like reference numerals refer to like elements throughout the different views. The drawings illustrate principals of the invention and, although not to scale, show relative dimensions.

DETAILED DESCRIPTION

Figure 1:
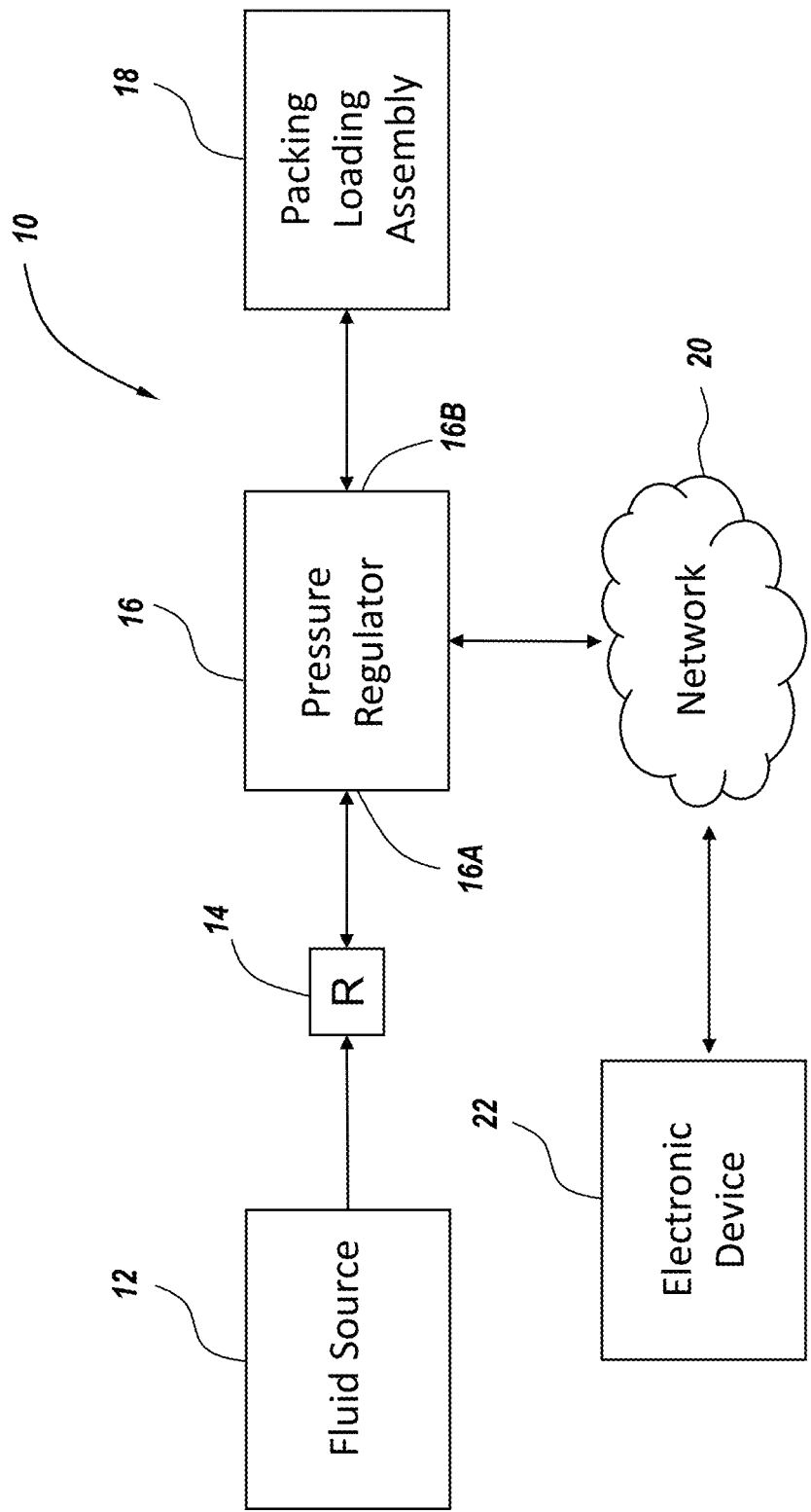
FIG. 1 is a schematic block diagram of the pressure regulating system employing a packing loading assembly according to the teachings of the present invention.
Figure 2:
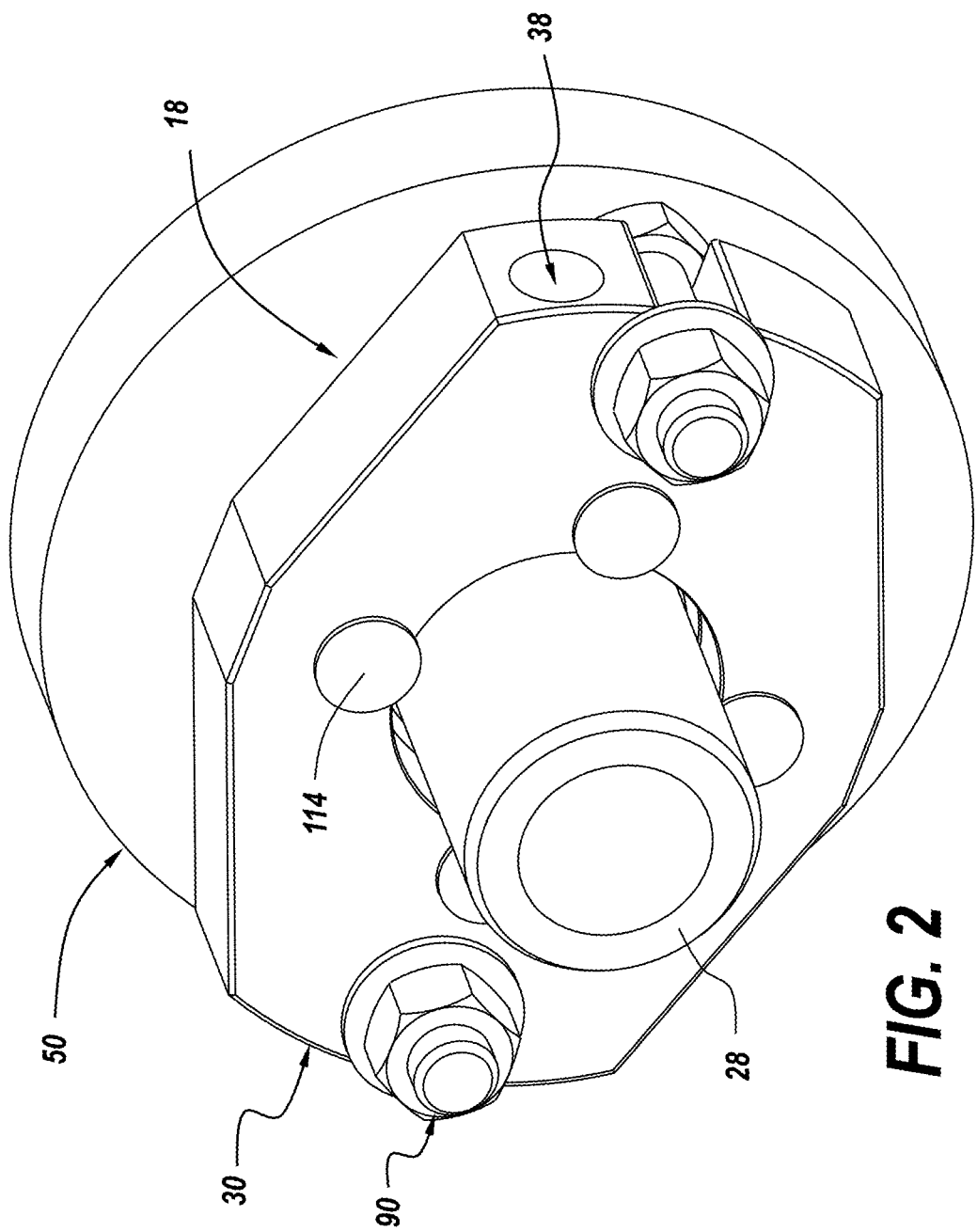
FIG. 2 is a perspective view of a first embodiment of the packing loading assembly for use with the pressure regulating system of FIG. 1 according to the teachings of the present invention.

The present invention is directed to a pressure regulating system used in connection with a packing loading assembly to provide an axial loading force to packing elements housed within stationary equipment in an automated manner. The axial biasing force can be controlled or regulated by use of the pressure regulating system that applies an axial fluid force to a follower element that in turn applies an axial loading force to the packing elements. Those skilled in the art will readily appreciate that the present invention may be implemented in a number of different applications and embodiments and is not specifically limited in its application to the particular embodiment depicted herein.

The term "shaft" as used herein is intended to refer to any suitable device in a mechanical system to which a seal can be mounted and includes shafts, rods, and other known devices.

The terms "axial" and "axially" as used herein refer to a direction generally parallel to the axis of a shaft. The terms "radial" and "radially" as used herein refer to a direction generally perpendicular to the axis of a shaft. The terms "fluid" and "fluids" refer to liquids, gases, and combinations thereof.

The term "axially inner" as used herein refers to that portion of the stationary equipment and/or components of a mechanical seal that are disposed proximate to the stationary equipment (e.g., mechanical system) employing the mechanical seal. As such, this term also refers to the components of the mechanical seal or packing loading assembly that are mounted to or within the stationary equipment or are disposed the deepest within or closest to the equipment (e.g., inboard). Conversely, the term "axially outer" as used herein refers to the portion of stationary equipment and the mechanical seal or packing loading assembly that is disposed distal (e.g., outboard) from the equipment.

The term "radially inner" as used herein refers to the portion of the mechanical seal, packing loading assembly or associated components that are proximate to a shaft. Conversely, the term "radially outer" as used herein refers to the portion of the mechanical seal, packing loading assembly or associated components that are distal from the shaft.

The terms "stationary equipment," "stuffing box" and/or "static surface" as used herein are intended to include any suitable stationary structure housing a shaft or rod to which a mechanical seal or packing loading assembly having a gland is secured. The stationary structure can include any type of commercial or industrial equipment such as pumps, valves, and the like. Those of ordinary skill in the relevant art will readily recognize that the gland assembly can form part of the mechanical seal, packing loading assembly or part of the stationary equipment.

The terms "process medium" and/or "process fluid" as used herein generally refer to the medium or fluid being transferred through the stationary equipment. In pump applications, for example, the process medium is the fluid being pumped through the pump housing.

The term "gland" as used herein is intended to include any suitable structure that enables, facilitates or assists securing the mechanical seal or the packing loading assembly to the stationary equipment, while concomitantly surrounding or housing, at least partially, one or more seal components. If desired, the gland can also provide fluid access to the mechanical seal.

The term "mechanical seal" as used herein is intended to include various types of sealing structure employed for sealing the process fluid between the movable (e.g., rotating) and stationary components of the stationary equipment and can include for example single seals, split seals, tandem seals, dual seals, concentric seals, gas seals, spiral seals, and other known seal types and configurations.

The term "packing material" as used herein is intended to include resilient and at least partially compressible materials for sealing a variety of fluids in a gland or stationary equipment under a wide array of pressures and temperatures.

The term "packing loading assembly" as used herein is intended to include any selected component or assembly of components, including at least for example a gland, for applying an axial loading pressure to packing elements formed from the packing material so as to provide a seal between the stationary and movable components of at least the stationary equipment.

The term "ambient environment" or "ambient pressure" is intended to include any external environment or pressure other than the internal environment of the gland, packing loading assembly, mechanical seal or stationary equipment.

The present invention is directed to a packing loading assembly having a gland within which a sealed cavity houses a piston loaded follower element that acts on the packing elements. The piston loaded follower element is activated by one or more externally regulated or controlled pressure sources that applies a pressure fluid or medium, such as for example by shop compressed air or a suitable water supply. A pressure regulating system can be used to help adjust, vary, or control the pressure within the gland and thus apply a generally or substantially constant or uniform axial loading force to the packing elements, or can vary the pressure as desired. As the packing elements relax over time due to wear, thermal cycling, vibration or pressure surges, the pressure fluid can be controlled, adjusted, or varied to help maintain a generally or substantially constant or uniform load on the packing elements. A fluid regulating element, such as a valve, can be used in the supply line to the pressure regulator so that the load on the packing elements is maintained even in the case of momentary interruption of the pressurizing fluid supply. The pressurized fluid supplies are commonly available in industrial or commercial plants. The desired load can be set remotely, in a convenient location and away from rotating machinery components, such as a shaft.

The present invention relates to a concept of an improved live pressure load packing loading assembly or system that automatically energizes packing elements mounted in stationary equipment to compensate for packing compression and wear over time. The present invention also allows for packing adjustment at a distance from rotating machinery parts. Once the packing elements are installed in the associated gland of the packing loading assembly and axially loaded with a suitable compressive force, the radial pressure in the packing needs to be equal to or greater than the pressure of the process fluid of the pump at a wet end (e.g., inner end) to effect proper and adequate sealing. The relaxation behaviors of the packing elements can be due to wear, thermal cycling, vibration, or pressure surges.

A structural component, such as a piston loaded follower element, can be configured to supply a hydraulic or pneumatically driven axial biasing force to the packing elements when mounted within the stationary equipment so as to restrict or prevent fluid leakage therefrom and to form a positive seal due to process fluid pressure from the equipment, such as a pump. The gland component can be fixed to the stationary equipment and preferably accommodates the follower element.

FIG. 1 illustrates the pressure regulating system 10 of the present invention. The pressure regulating system 10 includes a pressurized fluid source 12 for supplying a pressurized fluid to the packing loading assembly 18. The fluid can be a gas, such as air or nitrogen, or a liquid, such as water. The fluid source 12 is coupled through appropriate piping or mechanical connections to a pressure regulator 16 by way of a fluid regulating device 14. The pressure regulator 16 can be any suitable structure or device for regulating, controlling or varying the pressure of a fluid. The pressure regulator 16 has a fluid inlet 16A for receiving the fluid from the fluid source 12 and a fluid outlet 16B for passing the fluid to the packing loading assembly 18. The fluid from the pressurized fluid source 12 enters the fluid inlet 16A at a first higher pressure and typically exits the pressure regulator at the fluid outlet 16B at a second pressure, which can be lower than or substantially equivalent to the inlet pressure. The pressure regulator 16 can include mechanical structure such as a pressure setting or regulating element 16C (FIG. 6), which can include a spring, that is coupled to a sensor, such as a diaphragm or bellows, as is known in the art. The sensor can be configured to sense or detect the pressure of the fluid at the outlet 16B. The sensor can be in turn coupled to a restrictor element, such as a valve seat portion, that can be axially moved so as to control, adjust or vary the amount of fluid exiting the pressure regulator 16, thus controlling the pressure of the fluid at the fluid outlet 16B. The pressure regulator 16 can optionally employ feedback of the regulated pressure as an input to the setting or control mechanism of the regulator and can react to changes in the feedback pressure to control the opening of the restrictor element. The structure and operation of pressure regulators is well known in the art and hence need not be described further herein.

The fluid regulating device 14 can help control or regulate the flow of fluid between the fluid source 12 and the pressure regulator 16. According to one embodiment, the fluid regulating device 14 can be a valve, such as a check valve, that helps prevent the loss of fluid back through the pressure regulator 16 in the event that the fluid source 12 fails to provide an input fluid and corresponding pressure to the inlet of the pressure regulator 16. That is, the valve can be used in the supply line to the pressure regulator 16 so that the load on the packing elements is maintained even in the case of momentary or sustained interruption of the pressurizing fluid supply. The structure and operation of check valves is well known in the art and need not be described further herein. The pressure regulating system 10 can also employ for example one or more pressure sensors or detectors, such as pressure gauges, to measure the pressure of the fluid in the system at selected locations. The pressure sensors can be positioned at any selected location, such as on either side of the pressure regulator 16 or between the pressure regulator and the packing loading assembly 18.

The pressure regulator 16 and/or the packing loading assembly 18 can optionally communicate with an electronic device 22 either directly or through a network 20. The pressure regulator 16 and the packing loading assembly 18 can communicate directly with the electronic device 22 via any suitable wireless connection, such as Wi-Fi and Bluetooth connections. Alternatively, the devices can communicate with the electronic device 22 through a standard network 20. As is known, the network 20 an include one or more electronic devices such as servers, computers and the like. The servers can include appropriate processors, storage and memory as is known in the art. Further, suitable operational software can be stored in the storage for operating and controlling the servers and if desired one or more elements of the pressure regulating system 10. The electronic device 22 can be any suitable device, such as a server, computer, tablet, smartphone and the like. Similar to the servers of the network 20, the electronic device can also include known hardware such as one or more processors, memory and storage, as well as other structure, such as for example input devices (e.g., mouse and/or keyboard) and a display. Suitable system software can be stored either or both in the network 20 and the electronic device 22 for controlling and operating one or more elements of the pressure regulating system 10.

FIGS. 2-5 illustrate the features and elements of a first embodiment of the packing loading assembly 18 of the present invention. The packing loading assembly 18 can include a gland element 30 that is coupled to stationary equipment 50 by way of a series of fastening elements 90. The stationary equipment 50, which can include for example the housing of a pump, has a movable shaft 28 that extends outwardly therefrom and includes a process fluid that needs to be sealed within the pump housing. The shaft 12 can either rotate or can move linearly (e.g., reciprocate). The stationary equipment 50 can include a main body 52 that has a plurality of fastener receiving apertures 54 formed therein. The main body 52 also has a radially inner channel 56 formed therein having a bottom surface or flange portion 58 and an axially extending wall surface 60. The channel 56 seats the packing elements 110, such as a series of ring like packing elements that form a seal between the shaft 28 and the main body 52 of the stationary equipment 50 so as to seal the process fluid therein. The channel 56 can also seat if desired or necessary one or more bushings or bearing elements to help prevent one or more of the packing elements 110 from accidentally extruding from the channel 56. Hence, in operation, the packing elements 110 help form a seal between the elements and the shaft 28 as well as between the elements and the surfaces of the channel 56. The main body of the stationary equipment 50 has a top surface 52A and an opposed bottom surface 52B. The bottom surface 52B has a channel 62 formed therein for seating a sealing element. Those of ordinary skill in the art will readily recognize that the housing of the stationary equipment can have any selected configuration, and that the currently illustrated configuration is for purposes of illustration.

The packing loading assembly 18 can also include a gland element 30 and a follower element 70 that can be pre-assembled into a cartridge or can be separate mountable elements or components. The gland element 30 has a main body 32 that has opposed top and bottom surfaces 32A and 32B, respectively, as well as a side or peripheral surface 32C. The top surface 32A has a plurality of fastener-receiving apertures 34 formed therein for receiving a fastener assembly, including the fastener element 90. The fastener element 90 can be a bolt-like element that mates with a jam nut 92 on an axially inner end and with a washer 94 and a nut 96 at an axially outer end. Likewise, the top surface 32A of the main body 32 of the gland 30 can also optionally include a plurality of centering apertures 36 for seating a centering element, such as the centering button 114. The centering button 114 helps center the gland 30 relative to the shaft 28 during installation, as is known in the art. The bottom surface 32B of the gland 30 also includes an annular channel 40 forming an annular chamber.

The side surface 32C of the gland 30 can include one or more fluid supply ports 38 for supplying a pressurized fluid to the packing loading assembly 18 for applying a pressure to the packing elements 110 via the follower element 70. The fluid supply port 38 can include a first wide port section 38A for coupling to any selected fluid connection element, such as a pipe. The fluid supply port 38 also includes a second radial extending section 38B and a third axial extending section 38C that communicates with the channel 40. The side surface of the channel 40 has a pair of opposed channels 42, 44 formed therein for seating a sealing element 46, 48, respectively. The sealing elements 46, 48 form a fluid-tight seal with the follower element 70. The fluid supply port 38 can be formed in other surfaces of the gland 30 if desired. Those of ordinary skill in the art will readily recognize that the gland can have any selected shape or configuration, and that the currently illustrated configuration is for purposes of illustration.

The follower element 70 is axially movable and is sized and configured for applying an axial load or force to the packing elements 110 when properly pressurized by fluid applied thereto through the fluid supply port 38. The follower element 70 is movable between a pre-loaded position (FIG. 3) and a loaded position (FIG. 4). In the pre-loaded position, the follower element 70 contacts or is slightly separated from the packing elements 110 but does not properly or sufficiently load or apply an axial force thereto. When the pressurized fluid is supplied to the fluid supply port 38, the follower element 70 moves from the pre-loaded position to the loaded position and applies an axial force or load to the packing elements 110 so as to seal the process fluid within the stationary equipment 50.

Figure 3:
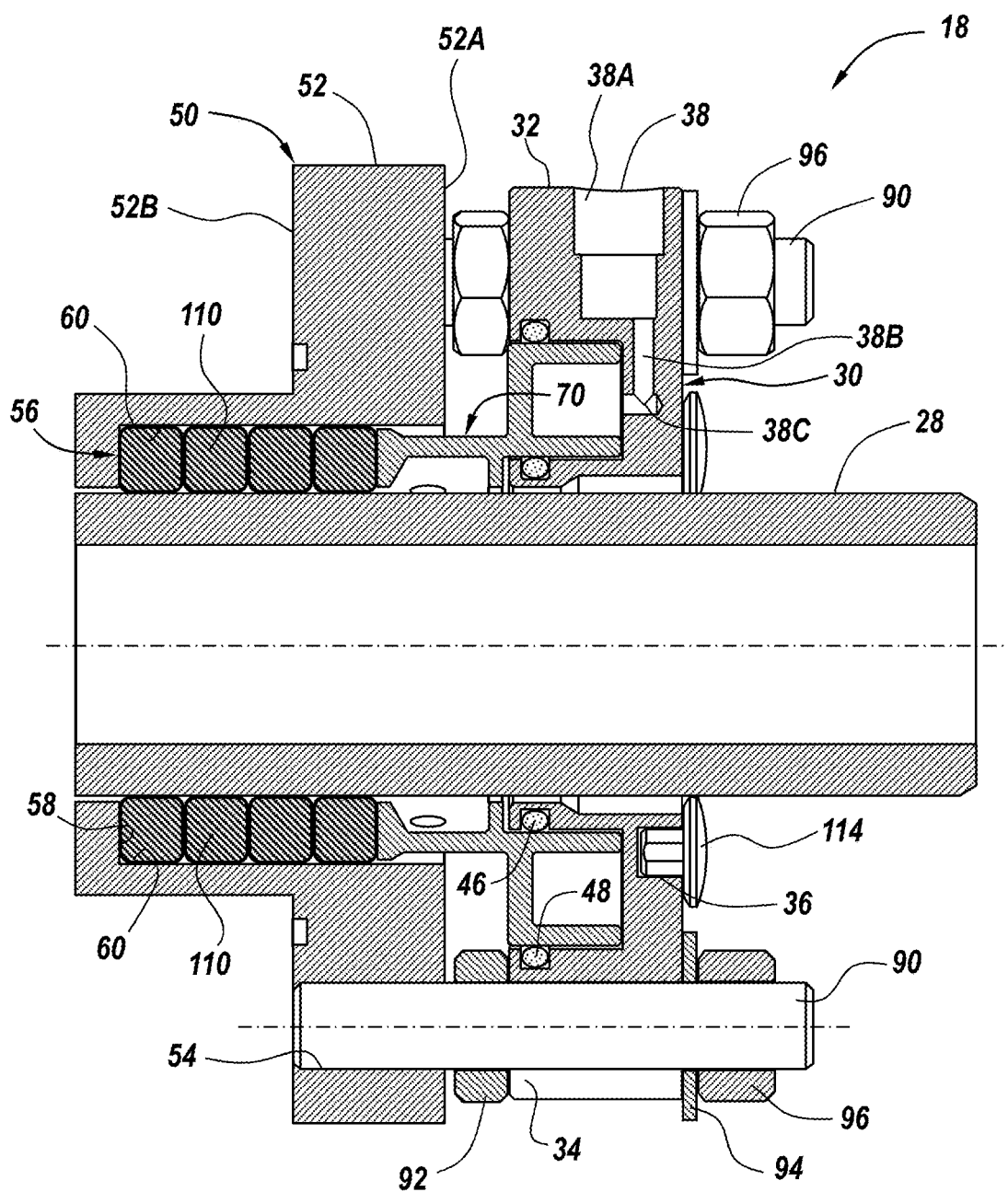
FIG. 3 is a cross-sectional view of the packing loading assembly showing the movable follower element disposed in a preloaded position according to the teachings of the present invention.
Figure 4:
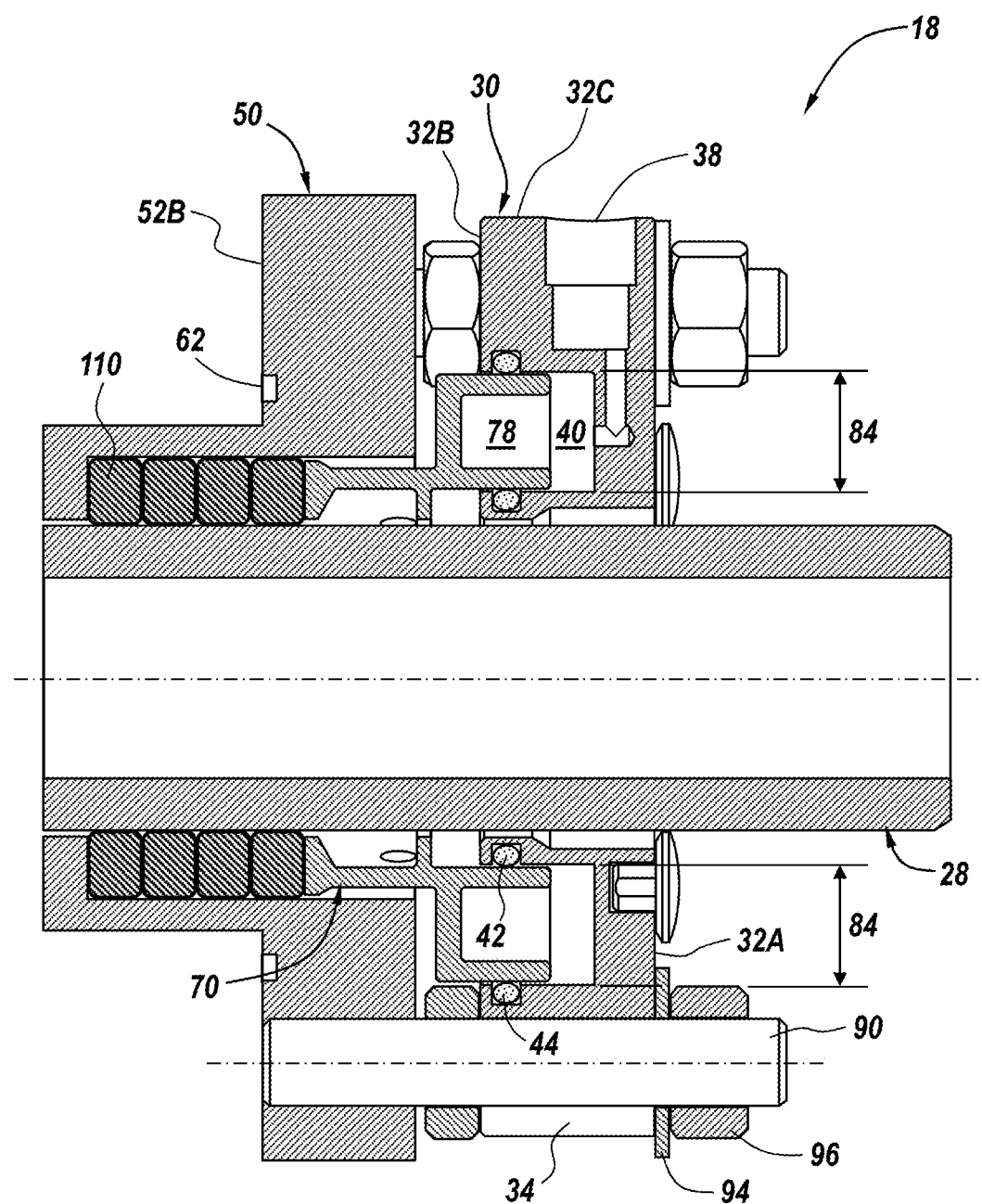
FIG. 4 is a cross-sectional view of the packing loading assembly showing the movable follower element in a loaded position according to the teachings of the present invention.
Figure 5:
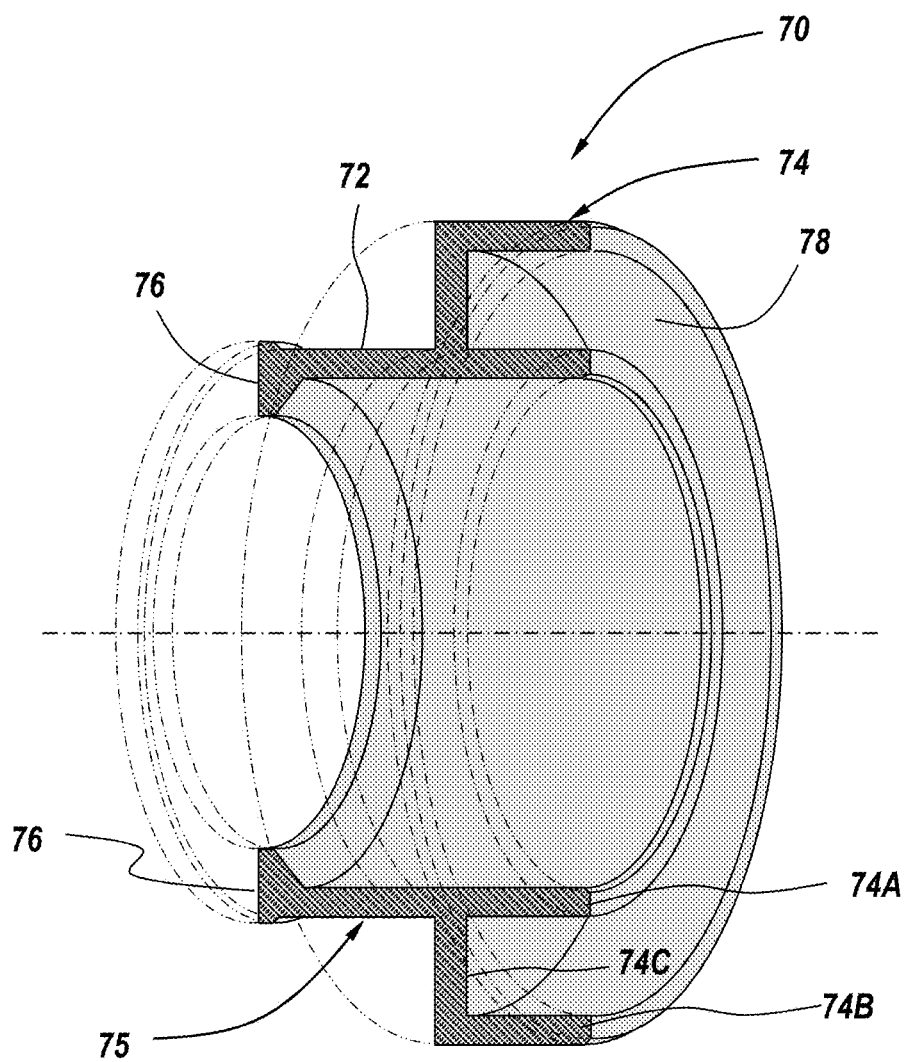
FIG. 5 is a cross-sectional view of the follower element of the packing loading assembly according to the teachings of the present invention.

The follower element 70, as shown in FIGS. 3-5, and especially in FIG. 5, includes a main body 72 having an axial first end having a bucket like structure 74 and an opposed second end having a stem-like structure 75 having a foot portion 76. The bucket like structure 74 has a main body having a U-shaped bucket structure that forms a chamber 78 that in connection and cooperation with the channel 40 forms a pressurized chamber for axially moving the follower element 70. The bucket structure 74 has a pair of opposed walls 74A and 74B that are radially spaced apart and are connected by a bottom wall 74C. The walls 74A, 74B, 74C have inner and outer surfaces. The stem-like structure has a main body having a substantially elongated, narrow stem like shape that terminates at a terminal end in a foot portion 76. The foot portion 76 has a larger, radial, planar surface area than the stem-like structure 74 and is configured to contact the axially outermost packing element 110 and apply an axial inward force to supply an axial load to the packing elements 110. Those of ordinary skill in the art will readily recognize that the follower element can have any selected configuration, and that the currently illustrated configuration is for purposes of illustration.

Figure 6:
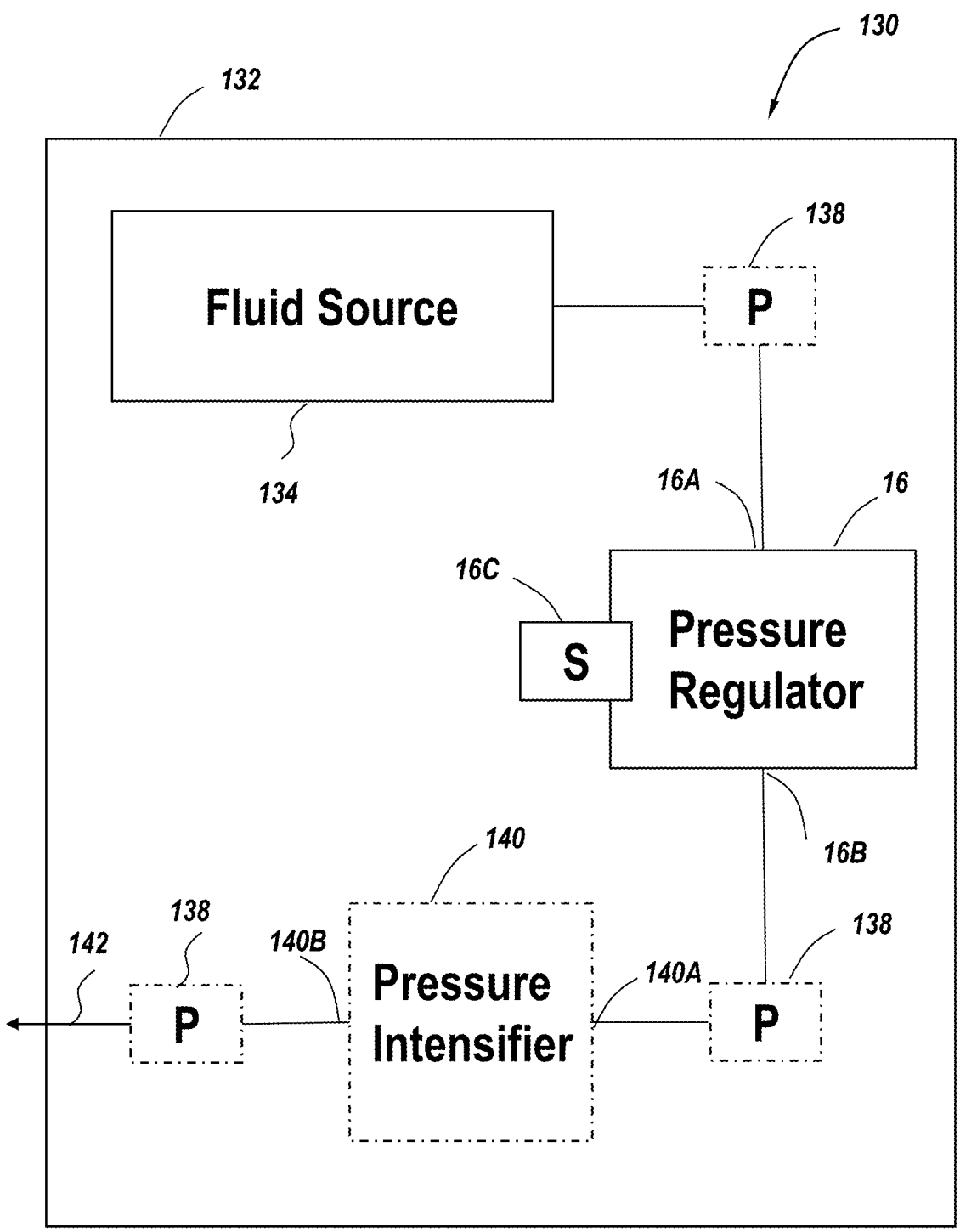
FIG. 6 is a schematic representation of a compact integrated structure housing that houses and employs the pressure regulating system of the present invention.

The pressure regulating system 10 can optionally include a pressure regulating subassembly 130 that includes selected elements of the pressure regulating system, including for example at least the fluid source and the pressure regulator. FIG. 6 shows one embodiment of a self-contained pressure regulating subsystem 130 suitable for use with the packing loading assembly 18 according to the teachings of the present invention. As shown, the pressure regulating subsystem 130 can include a housing 132 that can have any selected shape or size, and preferably is formed as a box. The box can have any suitable cover element, if desired, such as a door (not shown). The housing 132 can have the pressure regulating subsystem 130 mounted therein. The illustrated pressure regulating subsystem 130 can include a self-contained pressurized fluid source 134 that can be connected by suitable fluid conduits, such as piping, to the pressure regulator 16. The fluid source 134 can be the same as or similar to the fluid source 12. The pressure regulator 16 can include the pressure setting element 16C for setting the pressure level of the fluid at the outlet 16B of the pressure regulator. A fluid regulating element, such as a check valve (not shown), can also be included in the subsystem if desired. One or more optional pressure sensors, such as pressure gauges 138, can be used to detect or sense the pressure at selected locations of the pressure regulating subsystem 130, as shown.

The illustrated pressure regulating subsystem 130 can also include an optional pressure intensifier 140. The pressure intensifier 140 can be employed to increase the pressure of the fluid exiting the pressure regulator 16 to a higher-pressure level suitable for use with the packing loading assembly 18. Specifically, the pressure intensifier 140 has a fluid inlet 140A and a fluid outlet 140B. The fluid enters the fluid inlet 140A of the pressure intensifier at a first pressure level and exits the fluid outlet 140B at a second higher pressure level. As is known in the art, the pressure intensifier 140 can be constructed so as to provide a predetermined pressure increase. The pressure intensifier can thus be selected to provide a pressurized fluid at the fluid outlet 140B that is sufficient to provide an axial load on the packing elements 110. The pressurized fluid 142 exiting the pressure regulating subsystem 130 is then conveyed to the packing loading assembly 18 for energizing the packing elements 110.

In operation, the pressure regulating system 10 of the present invention can function and operate as follows. The packing loading assembly 18 of the present invention can be mounted to a stuffing box or stationary equipment 50 that includes a rotating shaft 28. In the channel 56 of the equipment 50, a stacked series of packing elements 110 are mounted therein. The packing loading assembly 18 includes the gland 30 and the follower element 70, and the gland 30 is coupled to the stationary equipment 50. Specifically, the foot portion 76 of the follower element is placed adjacent to and in contact with the axially outermost packing element 110. The bucket-like structure 74 of the follower element 70 seats within the channel 40 of the gland 30. The gland 30 is secured to the stationary equipment 50 by the fastener assemblies that includes the fastening element 90, the jam nut 92, the washer 94, and the nut 96. The centering device 114 can be employed to center the packing loading assembly 18 about the shaft 28. The packing loading assembly can also employ, if desired, a clip element (not shown) that can have a selected portion that seats between the follower element and the top surface of the stationary equipment for holding the follower element in the pre-loaded position during assembly and prior to operation.

The illustrated gland 30 includes a main body 32 having the channel 40 formed in the underside or bottom surface 32B to seat the upper bucket like portion of the follower element 70. The gland 30 has formed therein a fluid supply port 38 in a side surface 32C thereof that communicates with the channel 40. Additional sealing elements, such as O-rings, can be employed to help seal the pressurized fluid within the packing loading assembly. The follower element 70 has an upper portion that includes a bucket-like structure 74 that forms a chamber 78 that is positioned within the channel 40 formed in the gland 30, and an opposed lower portion that includes the foot portion 76 that is configured to contact and hence provide an axial load on the stacked packing elements 110. The combination of the channel 40 and corresponding chamber formed thereby and the chamber 78 of the bucket-like structure 74 form a pressurized fluid chamber.

The follower element 70 can be disposed in a first or initial pre-loaded position where the upper topmost surface of the bucket-like structure 74 of the follower element 70 is immediately adjacent to or contacts a floor or bottom wall surface 74C of the gland channel 40. The outer or exterior surfaces of the walls 74A, 74B of the bucket-like structure 74 can also contact if desired the side walls or surfaces of the gland channel 40. The channel 40 and the chamber 78 of the bucket-like structure 74 form in combination a fluid chamber that can be pressurized by the fluid source 12 to move the follower element 70 in an axial inward direction into the loaded or working position where the foot portion 76 of the follower element applies an axial load to the stacked set of packing elements 110. When axially loaded, the packing elements 110 help form a fluid seal to reduce or prevent leakage of the process fluid from the stationary equipment 50.

The pressure regulating system 10 provides a fluid, such as water, oil, air, or nitrogen, from the fluid source 12 that passes through the fluid regulator 14 and to the pressure regulator 16. The pressure regulator 16 can be optionally remotely controlled either directly or through the network 20 by the electronic device 22. The electronic device 22 helps set or define the pressure of the fluid exiting the pressure regulator 16 by establishing or setting the pressure level. Preferably, the pressure of the fluid exiting the pressure regulator 16 can be manually set via the setting element 16C. The fluid exiting the pressure regulator 16 can be selected according to system needs. The pressurized fluid is introduced by suitable conduits or piping to the fluid supply port 38 formed in the gland 30. The fluid supply port 38 communicates with the channel 40 of the gland and cooperates with the chamber 78 of the follower element to form the pressurized fluid chamber.

The pressurized fluid acts upon the bucket-like structure 74 of the follower element 70, and specifically the fluid acts upon a piston loaded area 84 defined between the outer surface of the radially outermost wall 74A of the bucket-like structure 74 and the outer surface of the radially innermost wall 74B of the bucket-like structure 74. The piston area 84 as formed by the bucket-like portion of the follower element is sized and dimensioned so that the axial load applied to the packing elements via the follower element is sufficient to effectuate a seal of the process fluid within the stationary equipment given the pressure of the fluid supplied by the fluid source 12. Those of ordinary skill in the art will readily be able to determine the appropriate size of the piston areas based on the overall dimensions of the packing loading assembly including the sizes of the follower element and the gland, and the pressure of the source fluid and the process fluid. The force of the pressurized fluid acting upon the piston area 84 of the follower element 70 axially moves the follower element 70, when sufficiently pressurized, from the pre-loaded position into the loaded position and therebetween. That is, when sufficiently pressurized, the piston loaded follower element 70 moves axially into the second loaded working position to apply a selected loading force to the packing elements 110. In this second position, the upper bucket-like 74 portion of the follower element 70 is spaced from the floor of the gland channel 40. The fluid supply port 38 can be coupled to any suitable fluid supply.

The electronic device 22 can optionally control the amount of force applied to the packing elements 110 by varying, regulating, or controlling the pressure of the fluid with the pressure regulator 16. That is, the pressure regulator 16 can sense the pressure within the packing loading assembly 18 by sensing the fluid pressure at the fluid outlet 16B thereof. The electronic device 22 can control the outlet pressure of the pressure regulator 16 by adjusting or manipulating the setting element of the pressure regulator. The pressure applied to the packing elements 110 through the piston loaded follower element 70 can thus be varied or adjusted based on the sealing capabilities of the packing material and in real time based on the load characteristics of the packing elements 110. Specifically, the pressure of the process fluid may change during operation of the packing loading assembly, and the sealing capabilities or characteristics of the packing material may change over time. As such, the pressure within the packing loading assembly changes and hence the loading force applied to the packing elements and necessary to maintain the fluid seal changes over time as well. The electronic device 22 via the pressure regulator can vary, adjust, or change the pressure of the pressurized fluid introduced to the packing loading assembly 18 to apply and maintain a selected constant or uniform pressure on the packing elements in real time. The force can thus be controlled continuously and dynamically to maintain the substantially uniform pressure on the packing elements 110. Alternatively, the pressure of the fluid supplied to the packing loading assembly 18 can be set by the pressure regulator 16 by manually adjusting the setting element 16C of the regulator. As used herein, the term "substantially uniform" or "substantially constant" is intended to include the ability to adjust, vary or control the pressure of the fluid supplied to the packing loading assembly such that the pressure varies by less than 2.0 psi, and preferably less than 1.0 psi.

According to one practice, the force applied to the packing elements 110 through the piston loaded follower element 70 can be remotely controlled through any suitable network 20. Further, the fluid supply pressure supplied to the packing loading assembly 18 can be controlled such that the pressure is automatically adjusted based on the wear characteristics of the packing material of the packing elements 110. There is no need to manually assess the sealing capabilities of the packing material and to manually adjust the force applied to the packing elements 110, such as by tightening a gland bolt, as is done in the prior art. Rather, the system 10 of the present invention allows the loading pressure applied to the packing elements 110 to be remotely controlled and to be controlled in an automated manner, thus reducing or eliminating the need for manual tightening of the gland bolts.

Further, the gland 30 and the piston loaded follower element 70 can optionally form a cartridge that can create a hydraulic or pneumatic cylinder actuation force. Thus, the present invention improves upon conventional products that live-load pump packing by providing a relatively constant or uniform force on the packing elements 110 rather than a fluctuating force or a force that decreases over time based on the wear characteristics of the packing material as well as a decrease or change in the force profile applied by loading springs in conventional systems. Thus, according to another practice, the present invention allows an operator to manually adjust the force applied to the packing material, if needed or desired, via the setting element 16C of the pressure regulator 16.

The loading mechanism of the present invention can operate with a wide variety of packing materials, including injectable packing materials. When using injectable packing material, the stuffing box can be refilled and hence no packing gland adjustments are required to return to the original positioning as the piston is pushed back within the gland and the optimal pressure load is maintained by the pressure regulator 16.

The gland 30 and/or the piston loaded follower element 70 can be adjusted for a wide range of axial travel and pressures. The present invention thus eliminates or reduces the need for periodic manual adjustments required with traditional bolted glands.

The present invention also provides for precise packing load control, which is more accurate than typical bolted gland assemblies. The system of the present invention also provides for remote adjustment for safety (e.g., no need for manually adjusting gland bolts near a rotating shaft). Specifically, many plant regulations do not allow mechanics near rotating elements after the pump has been started. However, the system 10 of the present invention can be configured so that the packing gland can be easily and remotely adjusted (i.e., from a safe distance away). Further, since the system 10 can employ existing hydraulic (i.e., water or oil) or pneumatic (i.e., air or nitrogen) systems that are present within many industrial installations, no significant retrofitting of the stationary equipment is necessary to employ the gland and follower element assembly.

In the system of the present invention, the load applied to the packing elements 110 can be relatively constant or uniform, as compared with prior art systems where the deflection of the loading structure changes over time, thus applying a non-constant or changing load to the packing elements 110.

FIGS. 7-11 illustrate a second embodiment of the packing loading assembly 18 for use with the pressure regulating system 10 of the present invention. Like reference numbers indicate like parts throughout the various views. The illustrated pressure regulating system 10 provides an external actuation subsystem for automatically applying a load to the packing elements 110. Specifically, the illustrated packing loading assembly 18 in the second embodiment of the invention provides a biasing force to the packing elements 110 via an external actuation subsystem as compared with providing fluid ports formed directly in the gland element as employed in the first embodiment.

The present invention is directed to a packing loading assembly 18 having a gland and an external actuation subsystem that includes an actuation element (e.g., a follower element) that acts on the gland element and hence the packing elements 110 so as to apply an axial biasing force thereto. The actuation element of the external actuation subsystem is activated by one or more externally regulated or controlled pressure sources that applies thereto a pressure fluid or charging medium, such as for example compressed air or a suitable water supply. A pressure regulating system can be used to help adjust, vary, or control the pressure within the gland and thus apply a generally or substantially constant or uniform axial loading force to the packing elements 110, or can vary the pressure applied to the packing elements 110 as desired. As the packing elements 110 relax over time due to wear, thermal cycling, vibration or pressure surges, the pressure fluid applied to the packing elements 110 can be controlled, adjusted, or varied to help maintain a generally or substantially constant or uniform load thereon. A fluid regulating element, such as a valve, can be used in the supply line to the pressure regulator so that the load on the packing elements is maintained even in the case of momentary interruption of the pressurizing fluid supply. The pressurized fluid supplies are commonly available in industrial or commercial plants. The desired load can be set remotely, in a convenient location and away from rotating machinery components, such as a shaft.

The second embodiment of the present invention also relates to the concept of providing an improved live pressure load packing loading assembly that automatically energizes or charges the packing elements 110 mounted in the stationary equipment 50 to compensate for packing compression and wear over time. The present invention also allows for packing force adjustment by field personnel at a distance from rotating machinery parts. Once the packing elements 110 are installed in the associated gland of the packing loading assembly 18 and axially loaded with a suitable compressive force, the radial pressure in the packing elements needs to be equal to or greater than the pressure of the process fluid of the stationary equipment at an inner end (e.g., wet end) to effect proper and adequate sealing. The relaxation behaviors of the packing elements 110 over time can be due to wear, thermal cycling, vibration, or pressure surges.

A structural component, such as an actuation element, can be configured to supply a hydraulic or pneumatically driven axial biasing force to the packing elements 110 when mounted within the stationary equipment 50 so as to restrict or prevent fluid leakage therefrom and to form a positive seal due to process fluid pressure from the equipment.

Figure 7:
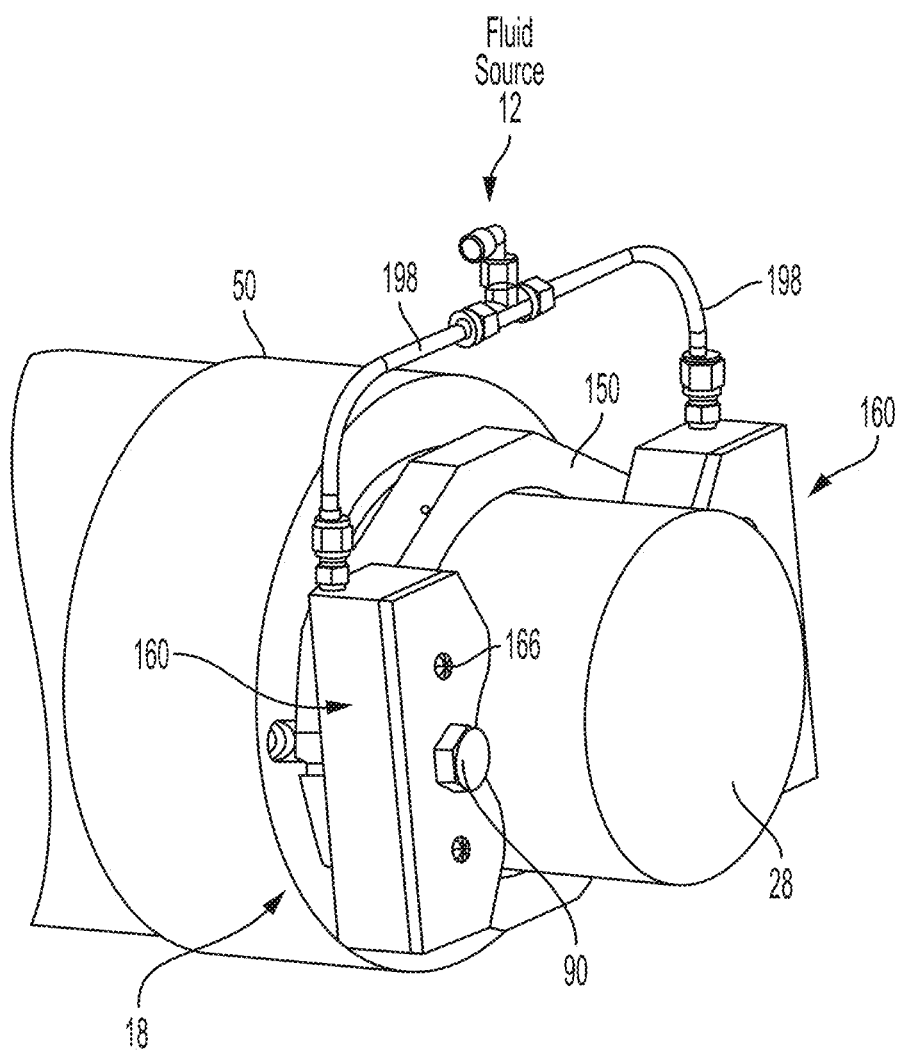
FIG. 7 is a partial perspective view of a pressure regulating system employing a second embodiment of the packing loading assembly according to the teachings of the present invention.
Figure 8:
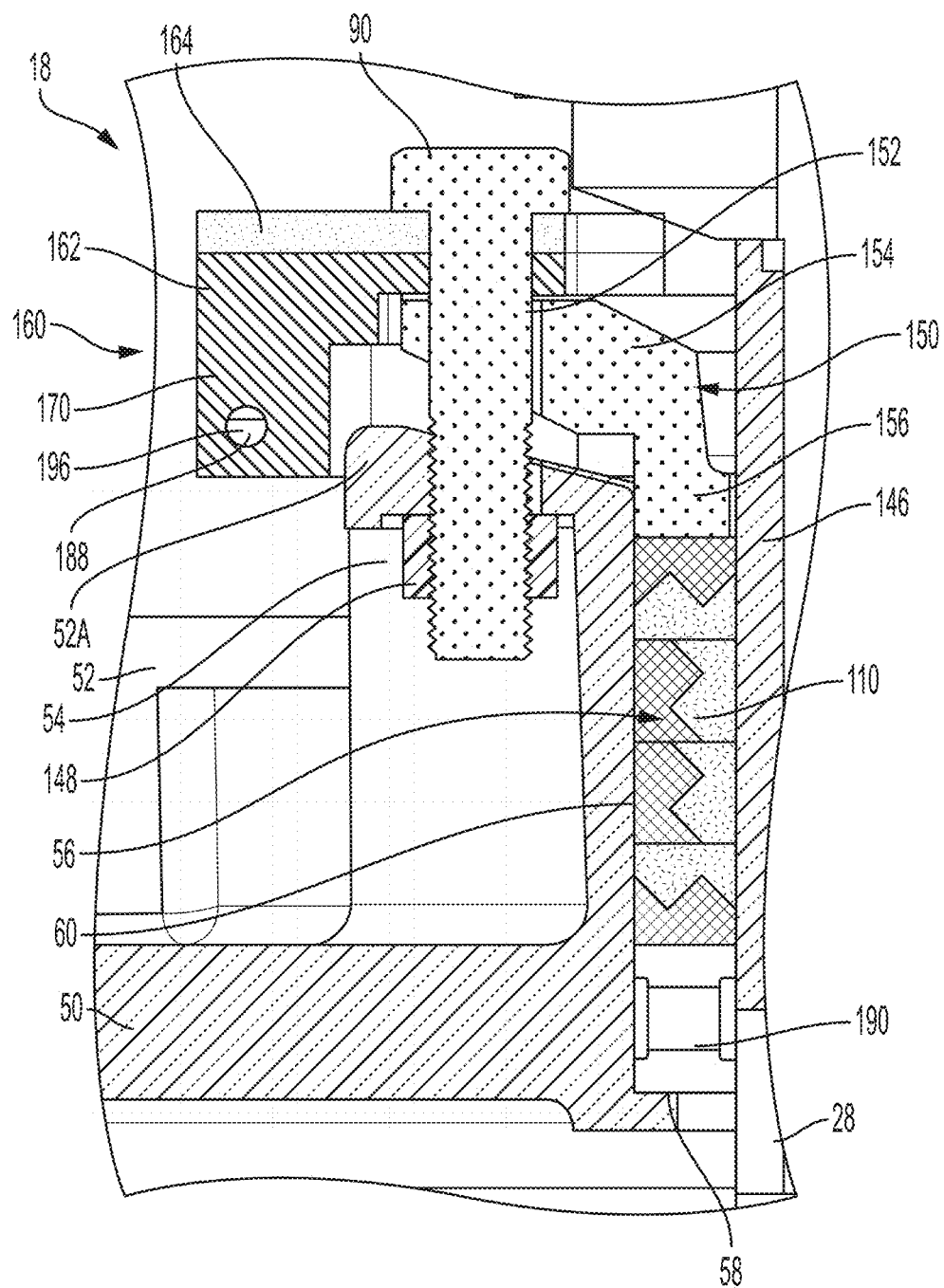
FIG. 8 is a partial cross-sectional view of the packing loading assembly of FIG. 7 according to the teachings of the present invention.
Figure 9:
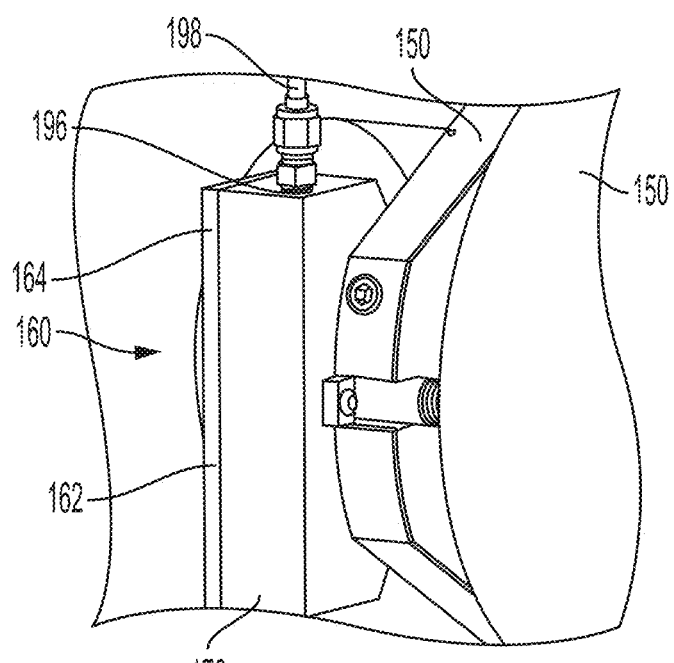
FIG. 9 is a partial perspective view from a rear of the stationary equipment illustrating the packing loading assembly of FIG. 7 according to the teachings of the present invention.

As shown in FIGS. 7-9, the illustrated packing loading assembly 18 includes a gland element 150 that is coupled to the stationary equipment 50 by way of a series of fastening elements 90, such as gland bolts. The gland element 150 has a main body that has a fastener receiving aperture 152 formed therein for receiving a portion of the shaft of the gland bolt 90. The gland element 150 also includes a top portion 154 having a top surface for contacting a surface of the external actuation subsystem 160 and a bottom flange portion 156 that has a surface that contacts the axially outermost packing element of the series of packing elements 110 for applying an axial biasing force thereto. The stationary equipment 50, which can include for example the housing of a pump, has a movable shaft 28 that extends outwardly therefrom and includes a process fluid that needs to be sealed within the pump housing. The shaft 28 can either rotate or can move linearly (e.g., reciprocate) relative to the stationary equipment. The stationary equipment 50 can include a main body 52 that has a plurality of fastener receiving apertures 54 formed therein. The fastener receiving aperture 54 can include an optional insert element 148 that helps retain a terminal end portion or region of the gland bolt within the aperture 54. The main body 52 of the stationary equipment also has a radially inner channel 56 formed therein having a bottom surface or flange portion 58 and an axially extending wall surface 60. The channel 56 seats the packing elements 110, such as a series of ring like packing elements, that form a seal between the shaft 28 and the main body 52 of the stationary equipment 50 so as to seal the process fluid therein. The packing loading assembly 18 can also include an optional sleeve element 146 that is coupled to the shaft and is rotatable therewith. The sleeve element 146 can be disposed between the packing elements 110 and the shaft 28. The sleeve element 146 can function as a protective barrier and a sealing interface between the shaft 28 and the packing elements 110, thus ensuring effective sealing while preventing the leakage of fluids from the stationary equipment 50. The sleeve element 146 can also serve to protect the shaft 28 and the packing elements 110 from wear and damage. For example, as the shaft 28 rotates, the shaft can cause friction and wear against the packing elements 110, leading to premature wear and reduced sealing effectiveness. The sleeve element 146 helps distribute this wear and protects both the shaft and the packing elements, extending the usable life of the sealing components. The sleeve element 146 also helps maintain the proper alignment of the packing elements 110 relative to the shaft 28. The sleeve element 146 ensures that the packing elements 110 remain securely in place and do not inadvertently shift or move during operation, which can lead to leaks or inefficient sealing. The channel 56 can also seat if desired or necessary one or more optional bushings or bearing elements to help prevent one or more of the packing elements 110 from accidentally extruding from the channel 56. Hence, in operation, the packing elements 110 help form a seal between the stationary equipment and the sleeve element 146 or the shaft 28. The main body 52 of the stationary equipment 50 has a top surface 52A and an opposed bottom surface. Those of ordinary skill in the art will readily recognize that the housing of the stationary equipment can have any selected configuration, and that the currently illustrated configuration is for purposes of illustration.

The channel 56 formed in the stationary equipment 50 can also seat an optional support element 190, such as a lantern ring. The lantern ring 190 can be disposed between the bottom surface 58 of the channel 56 and the packing elements 110. The lantern ring 190 helps axially position the packing elements 110 in the groove 56 and helps maintain the correct axial alignment of the packing elements 110, ensuring that they are in the proper contact and alignment to effectively seal the equipment. The lantern ring 190 can also offer radial support to the packing elements 110. The radial support helps prevent excessive deflection or misalignment of the sealing surfaces or faces of the packing elements, which can occur due to operational forces and vibrations in the equipment. Proper radial support contributes to the longevity and performance of the mechanical seal. The lantern ring 190 can also stabilize the packing elements 110, especially in applications where there may be some degree of misalignment or shaft deflection. The lantern ring 190 helps maintain the integrity of the fluid seal and prevents excessive wear or damage to the sealing faces of the packing elements.

The packing elements 110 can be compressed within an annular space formed by the channel 56 of the stationary equipment 50 (e.g., the stuffing box) that is disposed around the shaft 28. The gland bolts 90 can be used to compress the packing elements 110 to form a fluid-tight seal to the shaft 28. As the packing elements 110 wear, the axial biasing load decreases over time and fluid leakage about the shaft increases, such that gland bolt adjustments are required on a more regular basis. The biasing elements (e.g., springs) of various conventional configurations and designs have been used to maintain a biasing load on the packing elements 110 during adjustment periods. However, the load decreases as the springs elongate, and the axial travel is limited. Thus, conventional biasing approaches have significant drawbacks and limitations.

One basic principle of the second embodiment of the packing loading assembly 18 of the present invention is to employ an external actuation subsystem 160 that functions as a fluid power actuator that is mounted externally to the gland element 150 (e.g., is not formed within the gland element) and to the gland bolts 90 and functions to bias the gland element 150 in an axial direction against the packing elements 110. The actuation portion of the external actuation subsystem 160 is activated by an externally regulated pressurized fluid supplied by the pressure source 12 and can employ any suitable fluid, such as for example compressed air, nitrogen, or water. The pressure regulator 16 can be used to adjust the axially force applied to the gland, and thus can essentially adjust the uniform load transmitted to the packing elements 110.

The external actuation subsystem 160 of the present invention is shown for example in FIGS. 7-11, with particular reference to FIGS. 10A-10D and 11. The illustrated external actuation subsystem 160 is secured to the gland element 150 by way of the gland bolts 90. According to one embodiment, the external actuation subsystem 160 includes a housing 162 that is sized and configured to hold, mount or secure multiple actuators. The housing 162 includes a first or top housing component 164 that is coupled to and overlies a second or bottom housing component 170. The top housing component 164 can have a peripheral shape that is complementary to the peripheral shape of the bottom housing component 170. The top housing component 164 can have a central region 164A that is shaped to accommodate the gland bolt 90 or shaped to accommodate the shaft 28 and is disposed between opposed end regions. Alternatively, or additionally, the central region 164A can have an aperture 164B formed therein for seating a portion of the gland bolt 90. The top housing component 164 can also have formed therein a pair of retainer apertures 166 that are sized and configured for seating a retainer element 168, such as a screw. The retainer element 168 can be mechanically coupled to a plug element 192 for coupling or securing the plug element 192 to an underside or bottom surface of the top housing component 164. The plug element 192 can have one or more grooves formed therein for seating a sealing element 194, such as an O-ring. The plug element 192 can be used to secure the actuation element 180 to the top housing component 164.

The illustrated bottom housing component 170 has a main housing 172 that includes two or more chamber portions 174 that are connected by an intermediate housing portion 176. The intermediate housing potion 176 can have a fastener aperture 176A formed therein. The chamber portions 174 can each have a chamber 178 form therein. The chamber 178 can include a bottom surface 178A and a wall surface 178B. The chamber 178 can be sized and configured to seat the actuation element 180. The actuation element 180 includes a central cavity 182 that is sized and configured to seat the plug element 192. The sealing element 194 of the plug element is adapted to form a seal between the plug element 192 and an inner wall or surface of the cavity 182. The actuation element 180 can also include a groove 184 formed along an outer peripheral surface for seating a sealing element 186, such as an O-ring. When disposed within the chamber 178, the actuation element 180 is spaced from the bottom surface 178A of the chamber 178 to form a fluid gap or space 188. The sealing element 186 also contacts the wall 178B of the chamber to form a seal between the actuation element 180 and the chamber wall 178B. The main housing 172 can also include a fluid port 196 formed in the side wall 178B of the housing and chamber that fluidly communicates with the fluid gap 188. The fluid port 196 can be coupled to an external fluid conduit 198, such as a fluid supply pipe, for conveying a charging or actuation fluid to the fluid gap 188. The charging fluid can be supplied by the fluid source 12.

Figure 10A:
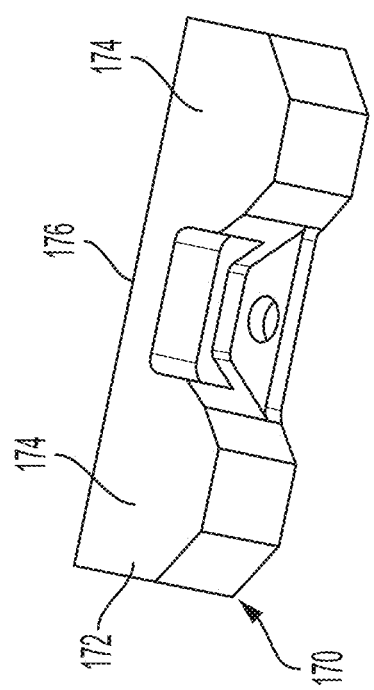
FIG. 10A is a perspective view of one embodiment of a bottom housing component of the external actuation subsystem according to the teachings of the present invention.
Figure 10B:
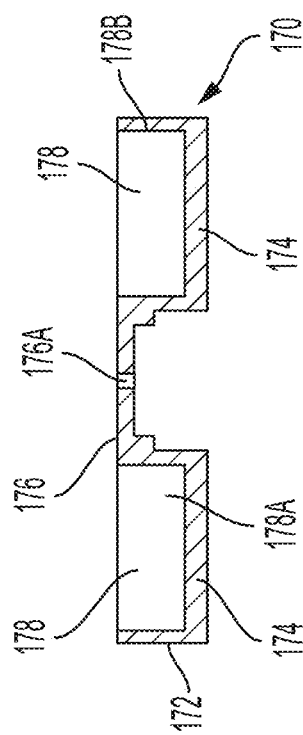
FIG. 10B is a cross-sectional view of the bottom housing component of FIG. 10A according to the teachings of the present invention.
Figure 10C:
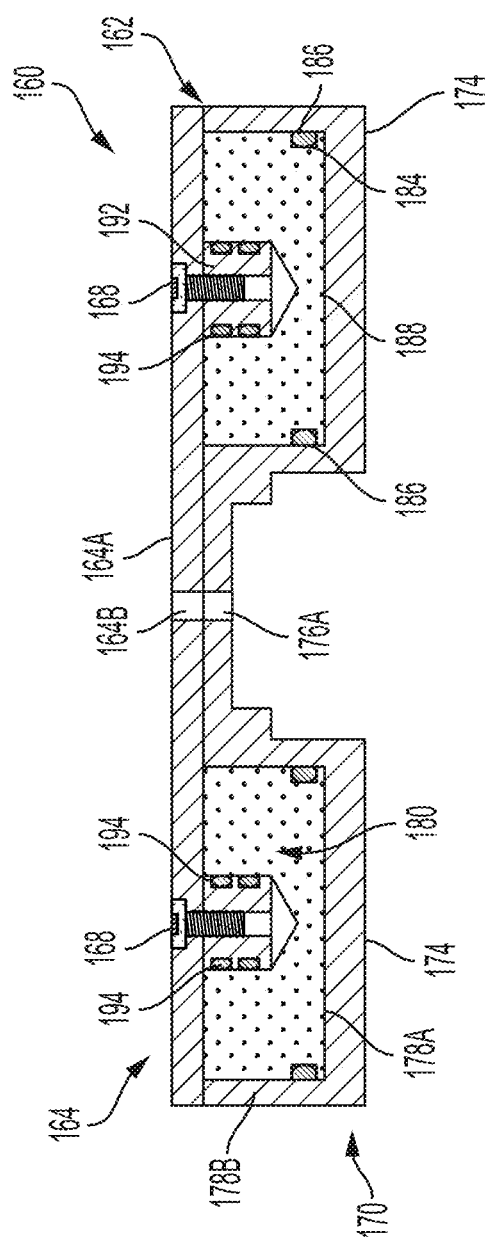
FIG. 10C is a cross-sectional view of the external actuation subsystem according to the teachings of the present invention showing the subsystem in a preloaded position.
Figure 10D:
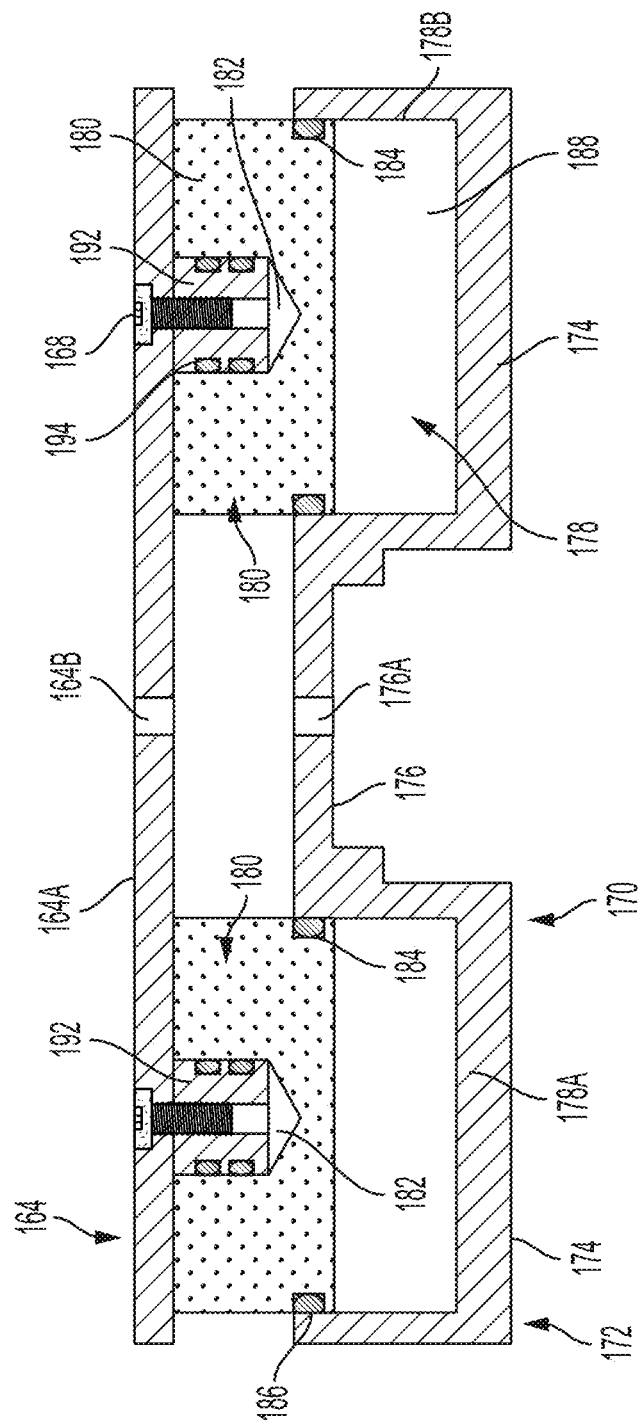
FIG. 10D is a cross-sectional view of the external actuation subsystem according to the teachings of the present invention showing the subsystem in a loaded position.
Figure 11:
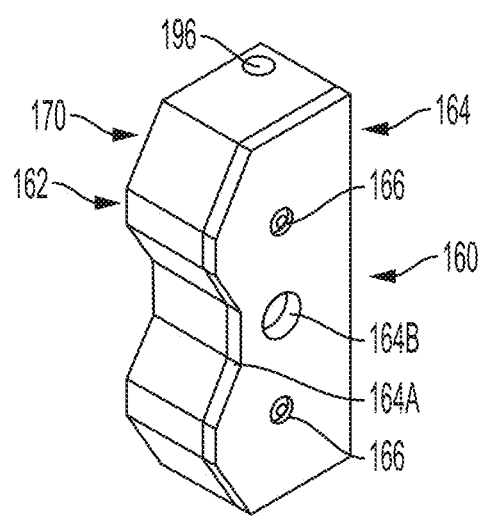
FIG. 11 is a perspective view of a second embodiment of the external actuation subsystem of the packing loading assembly of the present invention.
Figure 13:
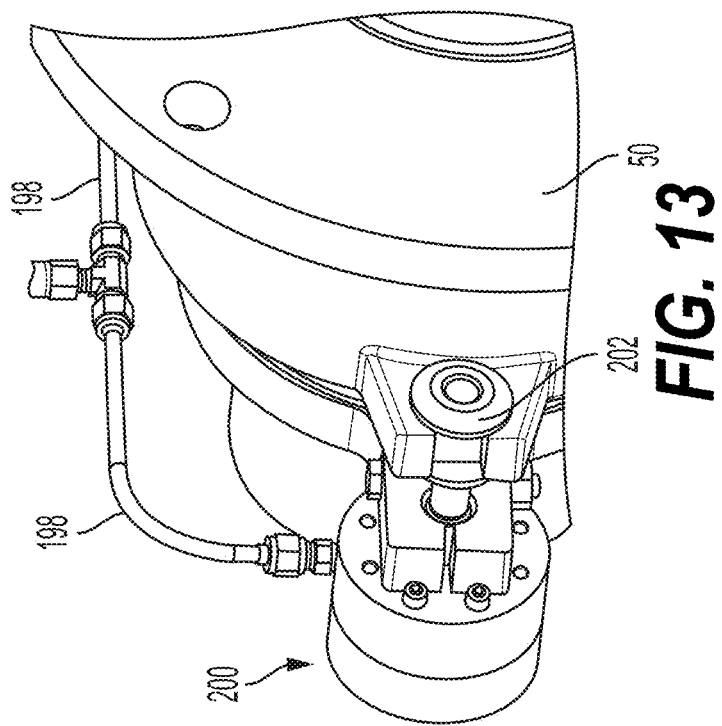
FIG. 13 is a rear perspective view of the packing loading assembly a FIG. 12 according to the teachings of the present invention.
Figure 12:
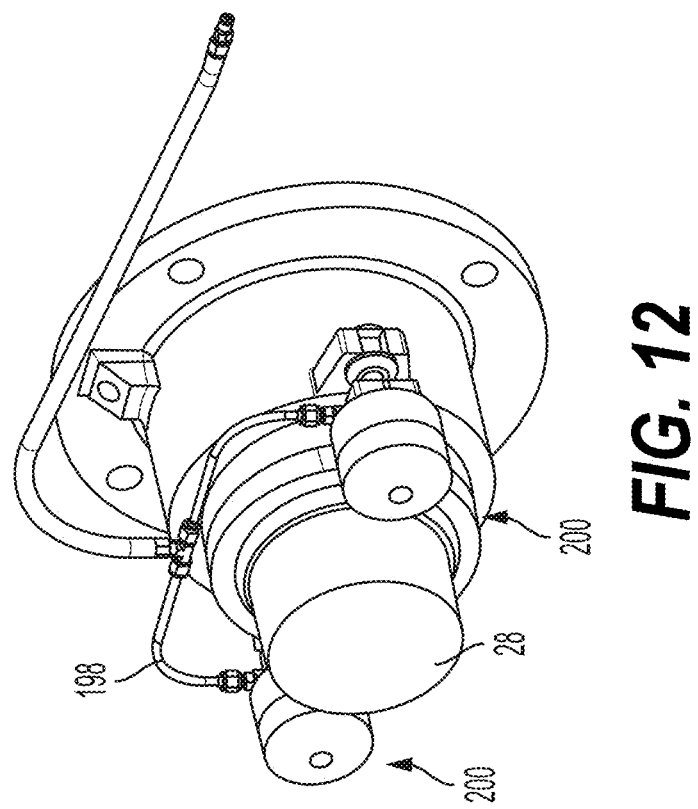
FIG. 12 is a perspective view of a second embodiment of the packing loading assembly according to the teachings of the present invention.

The external actuation subsystem 160 can be energized by the pressurized fluid to move between a pre-loaded position, where the bottom housing component 170 does not apply an axial load to the packing elements (FIG. 10C), to a loaded position (FIG. 10D) where the bottom housing component 170 applies the axial load to the packing elements 110. The axial load energizes the packing elements 110 to form a fluid tight seal between the shaft 28 and/or sleeve 146 and the packing elements 110 as well as between the packing elements 110 and selected surfaces of the stationary equipment. More specifically, the charging fluid serves to act upon the bottom surface of the actuation element 180 and on the chamber floor 178A so as to separate the bottom housing component 170 from the top housing component 164 and the actuation element 180 into the loaded position, as shown in FIG. 10D. Specifically, the top housing component 164 can remain relatively stationary and the bottom housing component 170 can be moved axially so as to apply a biasing force to the gland element 150 and to the packing elements 110. The sealing element 186 serves to provide a fluid seal between the chamber wall 178B and the actuation element 180 to retain the charging fluid introduced into the fluid gap 188 through the fluid port 196 within the fluid gap 188. The bottom housing component 170 when separated from the top housing component 164 contacts the top portion 154 of the gland element 150 and applies an axial biasing force thereto. The axial biasing force forces the bottom flange portion 156 of the gland element 150 into contact with the packing elements 110, thus applying an axial biasing force the assembly of packing elements. The bottom housing component 170 can be separated from the top housing component 164 by any selected amount or distance as defined by the dimensions of the chamber 178.

In operation, the external actuation subsystem 160 can be mounted about the gland bolt 90 by seating the gland bolt 90 in the apertures 164B, 176A formed in the housing components 164, 170, respectively. When this occurs, the chambers 178 and associated actuation elements 180 are mounted on opposite sides of the gland bolt 90. The bottom housing component 170 can be coupled to the fluid supply system, indicated by the fluid conduits 198. The fluid from the fluid source 12 can be eventually supplied to the chambers 178 via the fluid conduits 198 to the bottom housing component 170, and specifically can be supplied to the fluid gap 188 formed between the actuation element 180 and the floor 178A of the chamber 178. The pressurized fluid can axially move the bottom housing component 170 away from the relatively stationary actuation elements 180 and from the top housing component 164. The bottom housing component 170 contacts the top portion 154 of the flange element 150 and applies an axial force thereto. The bottom flange portion 156 of the gland element 150 then applies an axial biasing force to the packing elements 110 so as to help form and retain a fluid seal between the packing elements 110 and the sleeve element 146.

The external actuation subsystem 160 can apply pressure to the gland element 150 to load the compression packing elements 110. The present invention improves upon existing products that live-load pump packing by providing a relatively constant or uniform force or pressure instead of a spring force that applies inconsistent and decreasing levels of force over time. The pressure regulating system 10 can employ commonly available fluids, such as compressed air or water, that can be supplied via a pressure regulator to the external actuation subsystem 160. Since fluid power can be adjusted remotely, operators no longer need to actively adjust the gland bolts, thus allowing shop personnel to maintain a safe distance from the rotating or non-rotating equipment. Further, many plant regulations do not allow mechanics near rotating elements after the pump has been started. This eliminates the use of packing as a viable sealing solution in certain applications. With the current invention, this device may be configured so the packing gland can be easily adjusted remotely (i.e. from a safe distance away).

The packing loading assembly 18 of the present invention provides for advantages over conventional pressure loading systems. The external actuation subsystem 160 can employ multiple actuation elements associated with each gland bolt. Specifically, the actuation elements of the external actuation subsystem 160 can be disposed on opposed sides of the gland bolt 90. The external actuation subsystem 160 can be employed to apply a relatively uniform axial loading force to the packing elements 110. The external actuation subsystem 160 can be employed with conventional gland bolts and follower elements and can be mounted without completely disassembling the sealing equipment. The use of multiple actuation elements per gland bolt helps to provide additional axial biasing forces in applications that require such enhanced live loading of the packing elements 110. Further, the use of multiple external actuation subsystems 160 provides for enhanced axial biasing forces that can be applied to the packing elements without the need for employing higher pressure fluid. For example, the fluid pressure can be equal to or less than 100 psi (e.g., about 6.9 bars).

FIGS. 10A-10D and FIG. 11 illustrate different embodiments of the external actuation subsystems 160 according to the teachings of the present invention. The top and bottom housing components of the external actuation subsystem 160 illustrated FIG. 11 can be configured to nest or be seated adjacent to the gland bolt 90, where the head of the gland bolt secures the external actuation subsystems 160 directly to the gland element 150. Alternatively, the housing components can be configured to include openings that seat the gland bolt 90. The housing components 164, 170 of the external actuation subsystems 160 shown in FIGS. 10A-10D are configured to directly seat the gland bolt 90, such that the external actuation subsystems 160 are coupled to the shaft of the gland bolt 90. Consequently, the gland bolt 90 secures the external actuation subsystems 160 to the gland element 150.

Figure 17:
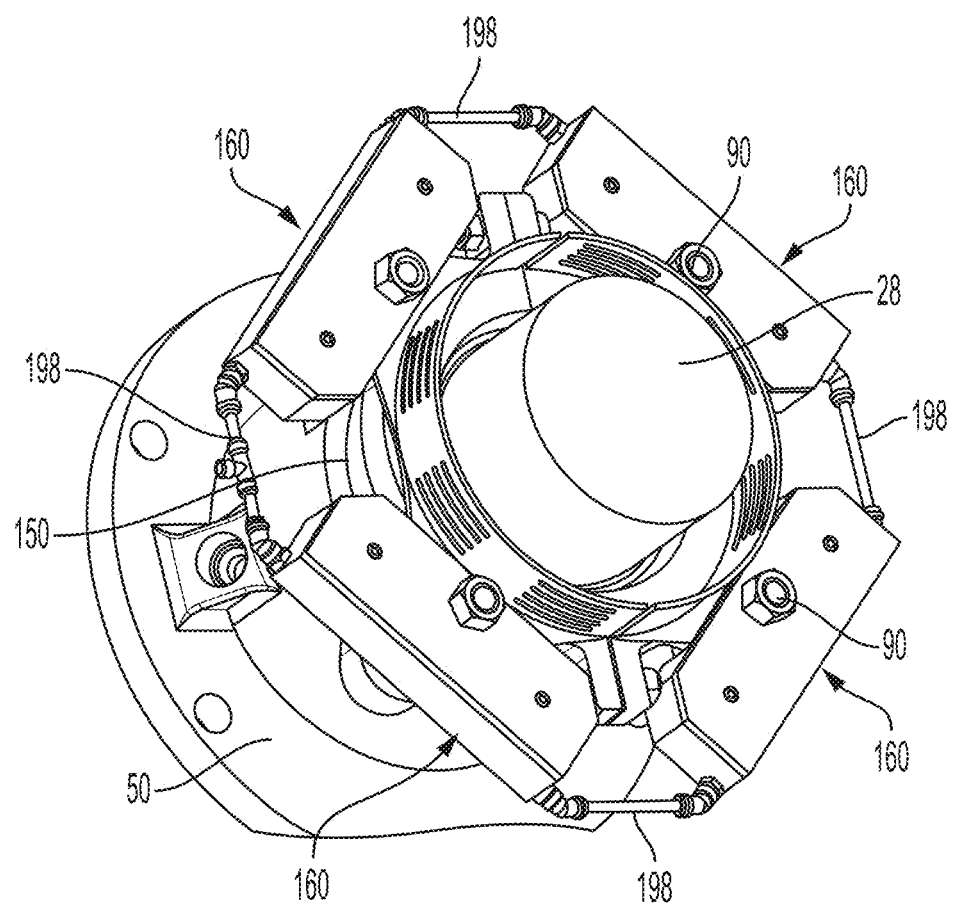
FIG. 17 is a perspective view of the packing loading assembly of FIG. 7 showing multiple (e.g., four) external actuation subsystems coupled to the stationary equipment and that are fluidly connected in series according to the teachings of the present invention.

FIG. 17 illustrates an example embodiment of a packing loading assembly 18 employing a plurality of external actuation subsystems 160 mounted about a plurality of gland bolts that are fluidly coupled together. According to the illustrated example embodiment, four external actuation subsystems 160 are coupled to the gland element 150 by way of four gland bolts 90. The external actuation subsystems 160 are fluidly coupled together, in series, by the fluid conduits 196. The fluid conduits 196 can be fluidly coupled to the fluid source 12 in order to apply pressurized fluid to the external actuation subsystems 160.

A third embodiment of the packing loading assembly 18 of the present invention is shown for example in FIGS. 12-16. Like reference numerals indicate like parts throughout the various views. The illustrated packing loading assembly 18 employs an external actuation subsystem 200 that employs the gland bolt as part of the actuation portion of the subsystem. Specifically, the external actuation subsystem 200 can move axially along the shaft of the gland bolt when moving between the preloaded and loaded positions. The illustrated packing loading assembly 18 includes a gland element 210 that is coupled to the stationary equipment 50 by way of a series of fastening elements, such as gland bolts 220. The gland bolt 220 has a shaft portion 222 and a head portion 224 coupled at one end to the shaft portion 222. The peripheral portion of the head portion 224 has a groove 226 formed therein that seats a sealing element 228, such as an O-ring. The illustrated gland element 210 has a main body that has a fastener receiving aperture 212 formed in a top portion 214 for receiving at least a portion of the shaft portion 222 of the gland bolt 220. The fastener receiving aperture 212 extends completely through the gland in an axial direction to allow the gland bolt 220 to pass therethrough and to connect to the stationary equipment 50. The top portion 214 of the gland element 210 has a top surface for contacting a surface of the external actuation subsystem 200 and a bottom flange portion 216 for contacting the axially outermost one of the packing elements 110 for applying an axial biasing force thereto. The illustrated stationary equipment 50, which can include for example the housing of a pump, has a movable shaft 28 that extends outwardly therefrom and includes a process fluid that needs to be sealed within the pump housing. The shaft 28 can either rotate or can move linearly (e.g., reciprocate) relative to the stationary equipment. The stationary equipment 50 can include a main body 52 that has a plurality of fastener receiving apertures 54 formed therein. The fastener-receiving aperture 54 can include an optional insert element 202 that has a central opening 204 formed therein that seats a terminal end portion 222A of the shaft 222 of the gland bolt 220. The terminal end portion 222A can be tapered or can have a stepped configuration, where the end portion 222A has a diameter that is smaller than the diameter of an intermediate portion of the shaft portion 222.

The main body 52 of the stationary equipment 50 also has a radially inner channel 56 formed therein having a bottom surface or flange portion 58 and an axially extending wall surface 60. The channel 56 seats the packing elements 110, such as a series of ring like packing elements that form a seal between the shaft 28 and the main body 52 of the stationary equipment 50 so as to seal the process fluid therein. The packing loading assembly 18 can also include an optional sleeve element 146 that is coupled to the shaft 28 and rotatable therewith. The sleeve element 146 is disposed between the packing elements 110 and the shaft 28. The sleeve element 146 can function as a protective barrier and a sealing interface between the shaft 28 and the packing elements 110, thus ensuring effective sealing while preventing the leakage of fluids from the stationary equipment 50. The channel 56 can also seat if desired or necessary one or more optional bushings or bearing elements to help prevent one or more of the packing elements 110 from accidentally extruding from the channel 56. Hence, in operation, the packing elements 110 help form a seal between the stationary equipment and the sleeve element 146 or shaft 28. The main body of the stationary equipment 50 has a top surface 52A and an opposed bottom surface. Those of ordinary skill in the art will readily recognize that the housing of the stationary equipment can have any selected configuration, and that the currently illustrated configuration is for purposes of illustration.

The channel 56 formed in the stationary equipment 50 can also seat an optional support element, such as a lantern ring 230. The lantern ring 230 can be disposed between the bottom surface 58 of the channel 56 and the packing elements 110. The lantern ring 230 helps axially position the packing elements 110 in the groove 56 and helps maintain the correct axial and radial alignment of the packing elements 110, ensuring that they are in the proper contact and alignment to effectively seal the equipment. The lantern ring 230 can also offer radial support to the packing elements 110. The radial support helps prevent excessive deflection or misalignment of the sealing surfaces or faces of the packing elements, which can occur due to operational forces and vibrations in the equipment. Proper radial support contributes to the longevity and performance of the mechanical seal. The lantern ring 230 can also stabilize the packing elements 110, especially in applications where there may be some degree of misalignment or shaft deflection.

The packing elements 110 can be compressed within an annular space formed by the channel 56 of the stationary equipment 50 (e.g., the stuffing box) that is disposed around the shaft 28. The gland bolts 220 can be used in combination with the external actuation subsystem 200 and the gland element 210 to compress the packing elements 110 in the channel 56 to form a fluid-tight seal to the sleeve element 146. As the packing elements 110 wear, the axial biasing load decreases over time and fluid leakage about the shaft increases, such that gland bolt adjustments or axial pressure applied to the packing elements 110 are required on a more regular basis. The conventional biasing elements, such as springs, of various conventional configurations and designs have been used to maintain a biasing load on the packing elements 110 during adjustment periods. However, the load decreases as the springs elongate, and the axial travel is limited. Thus, conventional biasing approached have significant drawbacks and limitations.

A basic principle of operation of the third embodiment of the packing loading assembly 18 of the present invention is to employ an external actuation subsystem 200 that functions as a fluid power actuator that is mounted externally to the gland element 150 and mounted on and about the gland bolt 220. The external actuation subsystem 200 functions to bias the gland element 210 in an axial direction against the packing elements 110. The actuation portion of the external actuation subsystem 200 is activated by an externally regulated pressure source supplying pressurized fluid, such as for example compressed air, nitrogen, or water. The pressure regulator 16 can be used to adjust the axially force applied to the gland element 210, and thus can essentially adjust the uniform load transmitted and applied to the packing elements 110.

The external actuation subsystem 200 of the present invention is shown for example in FIGS. 12-16. The illustrated external actuation subsystem 200 is mounted about the gland bolt 220 and is configured to be axially movable along the shaft 222 of the bolt 220 as a function of, or based on, the pressure of the fluid introduced into the external actuation subsystem 200 from the fluid source 12. According to one embodiment, the external actuation subsystem 200 includes a housing 242 forming a first or top housing component 250 and a second or bottom housing component 260. The top housing component 250 can have any selected shape, and according to one embodiment, has a circular shape. The bottom housing component 260 has a shape similar to or complementary to the top housing component 250. The top housing component 250 has a main body 252 that includes a top portion 254 and a sidewall 256 forming a chamber 258. The top housing component 250 is sized and configured to couple to and to overlie the bottom housing component 260.

The illustrated bottom housing component 260 has a main housing 262 that has a floor or bottom portion 264 and a sidewall 266 forming a chamber 268. The chamber 268 can be sized and configured to seat the head portion 224 of the gland bolt 220. Specifically, the sealing element 228 mounted in the groove 226 of the bolt head portion 224 engages with the inner surface of the sidewall 266 to form a fluid-tight seal. The outer diameter of the sidewall 266 of the bottom housing component 260 is smaller than the inner diameter of the sidewall 256 of the top housing component 250 to enable the bottom housing component 260 to seat and nest within the top housing component 250. Further, the inner diameter of the sidewall 266 of the bottom housing component 260 is larger than the outer diameter of the bolt head 224, such that the bottom housing component can freely move axially along the gland bolt. The bottom housing component 260 can also include an optional housing sealing element 248 for providing a secondary seal between any combination of the bottom housing component 260, the head of the gland bolt, and the top housing component 250. The housing sealing element 248 can be mounted within an optional groove formed adjacent to the terminal end or rim of the sidewall 266. Alternatively, the housing sealing element 248 can be seated on the rim of the sidewall 266 to forma seal between the housing components.

Figure 15A:
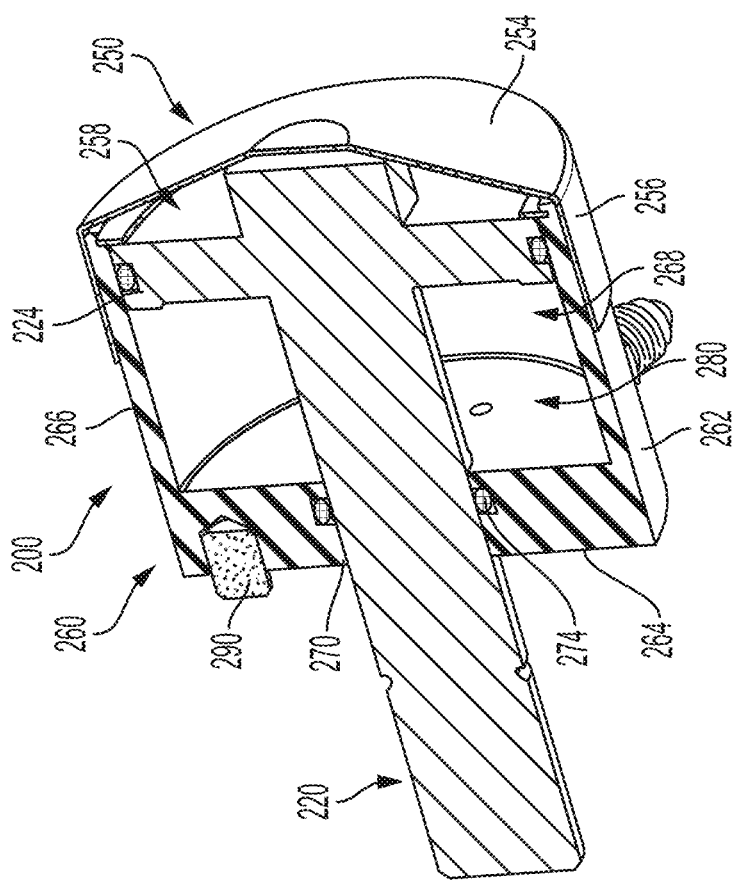
FIGS. 15A and 15B are partial cross-sectional views of the external actuation subsystem of FIG. 12 showing the subsystem disposed in a loaded position and in a preloaded position, respectively.
Figure 14:
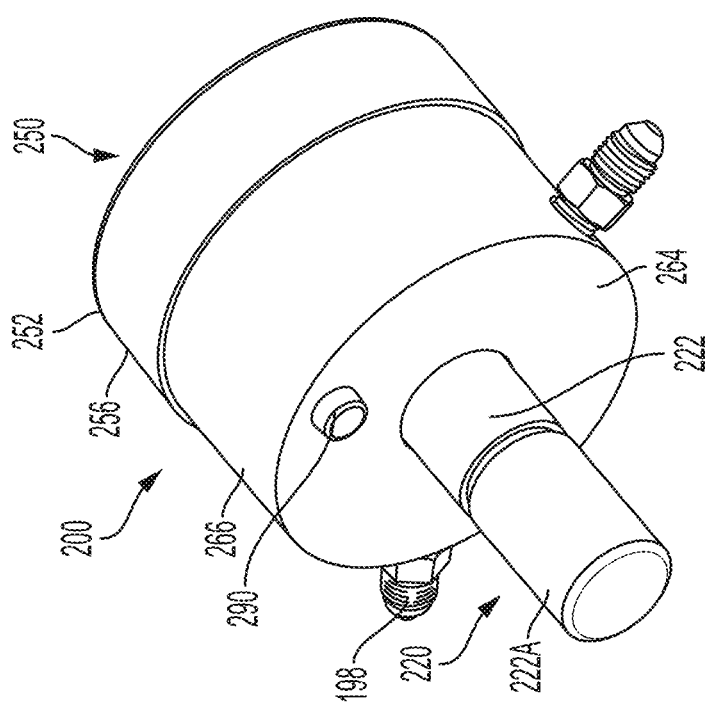
FIG. 14 is a perspective view of the external actuation subsystem of the packing loading assembly of FIG. 12 according to the teachings of the present invention.
Figure 15B:
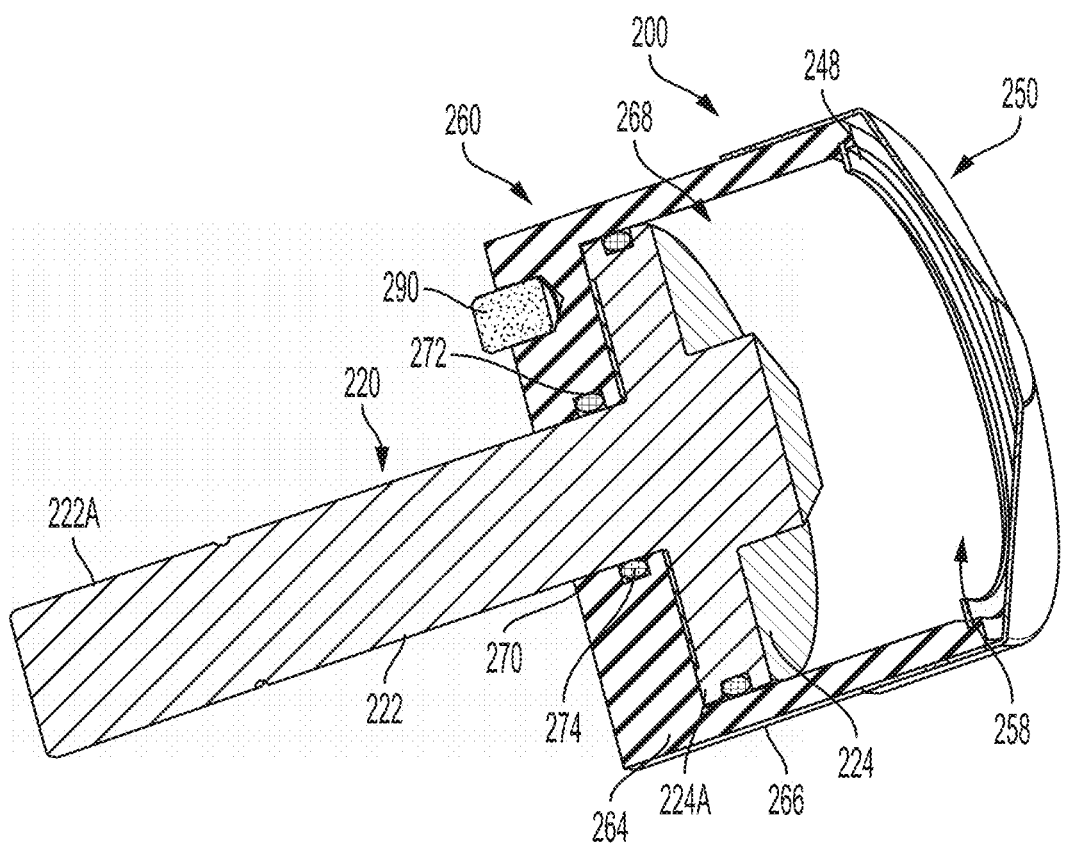
Figure 16:
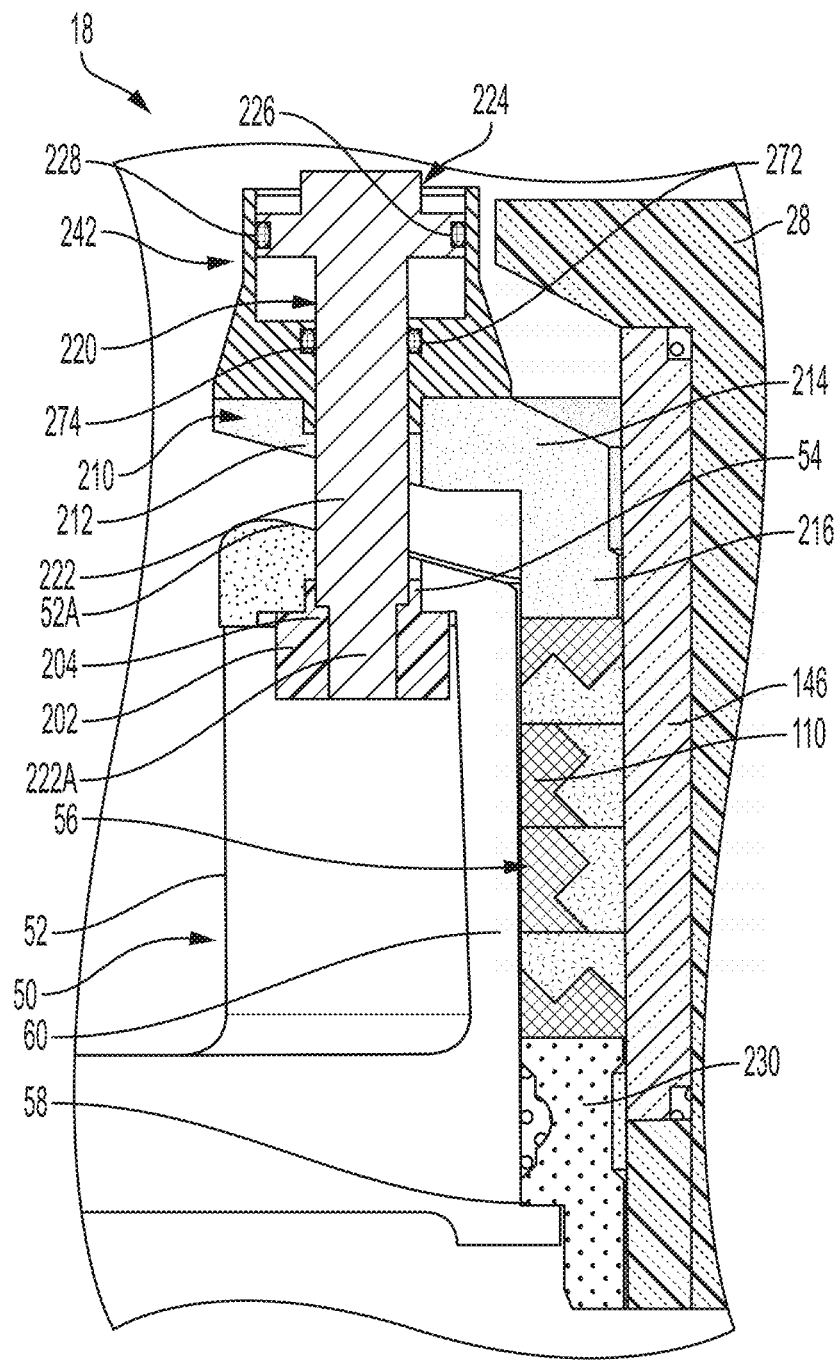
FIG. 16 is a partial cross-sectional view of the packing loading assembly of FIG. 12 according to the teachings of the present invention.

Further, the floor 264 of the bottom housing component 260 has a central opening 270 formed therein that is sized and configured to seat a portion of the shaft 222 of the gland bolt 220. The opening 270 also has a groove 272 formed therein that seats a sealing element 274. The sealing element 274 contacts an outer surface of the bolt shaft 222 and forms a fluid-tight seal such that any pressurized fluid within the chamber 268 is sealed therein and does not leak past the sealing element 274. The bottom portion 264 of the bottom housing component 260 can also be configured to seat an anti-rotation element 290 that can seat or mount within a corresponding hole formed in the gland to prevent the external actuation subsystem 200 or the bottom housing component 260 from accidentally rotating during use. When the top housing component 250 and the bottom housing component 260 are assembled together, the head portion 224 of the bolt is encased within the chamber 268 and the head portion 224 and the bottom or floor portion 264 of the bottom housing component 260 define a fluid gap or space 280 within the chamber 268. The axial travel of the head portion 224 within the chamber 268 is defined by the height of the chamber 268 in the external actuation subsystem 200. The bottom housing component 260 can also have a fluid port 282 formed therein. The fluid port 282 can be formed either in the sidewall 266 of the bottom housing component 260 or in the floor portion 264. According to one embodiment, the sidewall 266 has a fluid port 282 formed therein and communicates with the fluid gap 280. The fluid port 282 can be coupled to an external fluid conduit 198, such as a fluid supply pipe, for conveying a charging or actuation fluid to the fluid gap 280. Prior to charging the external actuation subsystem 200, the external actuation subsystem 200 is disposed in the preloaded position as shown in FIG. 15B where the head portion 224 of the gland bolt 220 is adjacent to or contacts the bottom portion 264 of the bottom housing component 260. The fluid gap 280 is defined by the underside of the head portion 224 and the bottom portion 264, and optionally the sidewall 266 depending upon the specific axial position of the head portion 244 within the chamber 268. According to one embodiment, the underside of the head portion 224 can have a lip potion 224A formed therein that separates the head portion 224 from the floor 264. The lip portion 224A can optionally include a fluid passage (not shown) that communicates with the fluid port 282 to enable the fluid to pass through the fluid port 282 and the fluid passage and into the fluid gap 280. When the external actuation subsystem 200 is sufficiently charged by the introduction of pressurized fluid into the fluid gap 280, the fluid pushes against the underside of the head portion 224 such that the external actuation subsystem 200 moves axially downwardly along the shaft 222 of the gland bolt 220 into engagement with the gland element 210. The underside of the bottom portion 264 of the bottom housing component 260 contacts the gland element 210 and applies an axial biasing force thereto. The flange portion 216 of the gland element 210 pushes axially downwardly on the packing elements 110 to apply an axial biasing force thereto, as shown in FIGS. 15A and 16.

In operation, the external actuation subsystem 200 can be mounted about the gland bolt 220 by passing the bolt shaft 222 through the opening 270 in the bottom housing component 260 and seats the head portion 224 within the chamber 268. The top housing component 250 is then seated on top of the bottom housing component 260 and secured thereto, thus retaining or capturing the head portion 224 of the gland bolt 220 therebetween. The gland bolt shaft 222 passes through the fastener receiving aperture 212 formed in the gland element 210 and the terminal end 222A of the shaft seats within the fastener receiving aperture 54 formed in the stationary equipment 50. The flange portion 216 of the gland element 210 is disposed adjacent to and preferably contacts the axially outermost one of the packing elements 110 to apply an axial biasing force thereto. When the external actuation subsystem 200 is initially mounted in the packing loading assembly 18 or when the process medium has a pressure higher than the pressure within the fluid gap 280 of the external actuation subsystem 200, the external actuation subsystem 200 is disposed in a preloaded position, as shown in FIG. 15B. The fluid source 12 then applies pressurized fluid through the fluid conduits 198 and through the fluid port 282 and into the fluid gap 280. The pressurized fluid has a pressure higher than the pressure of the process medium, and as a result the external actuation subsystem 200 moves axially downwardly along the shaft 222 of the gland bolt into the loaded position, as shown in FIGS. 15A and 16. The sealing elements 228 and 274 form a fluid tight seal and keep the pressurized fluid within the fluid gap 280. The bottom housing component 260 of the external actuation subsystem 200 pushes against the gland element 210, such that the flange portion 216 applies an axial biasing force to the packing elements 110.

The external actuation subsystem 200 can apply pressure to the gland element 210 to load the compression packing elements 110. The present invention improves upon existing products that live-load pump packing by providing a relatively constant force instead of a spring force that applies inconsistent and decreasing levels of force over time. The pressure regulating system 10 can employ commonly available fluids, such as compressed air or water, that can be supplied via a pressure regulator to the external actuation subsystem 200. Since fluid power can be adjusted remotely, operators no longer need to actively adjust the gland bolts, thus allowing shop personnel to maintain a safe distance from the rotating or non-rotating equipment. Further, many plant regulations do not allow mechanics near rotating elements after the pump has been started. This eliminates the use of packing as a viable sealing solution in certain applications. With the current invention, this device may be configured so the packing gland can be easily adjusted remotely (i.e. from a safe distance away).

The external actuation subsystem 200 of the present invention provides for a single external actuator that works in cooperation with the gland bolt to apply an axial biasing force to the packing elements 110.

It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

We claim:

1. A system for regulating an axial biasing force applied to a stacked set of packing elements mounted within stationary equipment, comprising
    a fluid source for supplying a source of fluid,
    a pressure regulator for regulating the pressure of the fluid to form a pressurized fluid, and
    a packing loading assembly for sealing a process fluid within the stationary equipment and for applying the axial biasing force to the packing elements via the pressurized fluid from the pressure regulator, wherein the packing loading assembly includes
        a gland element for mounting to the stationary equipment by a plurality of gland bolts, and
        an external actuation subsystem for coupling to at least one of the plurality of gland bolts for applying an axial actuation force directly to the gland element in response to the pressurized fluid, and wherein the gland element in response to the axial actuation force applies the axial biasing force to the packing elements.

2. The system of claim 1, wherein the gland element comprises a top portion having a top surface for contacting a bottom surface of the external actuation subsystem and a bottom flange portion that has a surface that contacts an axially outermost one of the packing elements for applying the axial biasing force thereto.

3. The system of claim 2, wherein the external actuation subsystem comprises a top housing component and a bottom housing component that is separable from and axially movable relative to the top housing component.

4. The system of claim 3, wherein the top housing component has a main body having a central region that is shaped to accommodate the gland bolt and is disposed between opposed first and second end regions, and wherein the first end region has a first retainer aperture formed therein for seating a first retainer element and the second end region has a second retainer aperture formed therein for seating a second retainer element.

5. The system of claim 4, wherein the external actuation subsystem further comprises first and second plug elements for coupling to the main body of the top housing component, wherein each of the first and second plug elements includes a groove formed in a peripheral outer surface thereof for seating a plug sealing element.

6. The system of claim 5, wherein the first plug element is coupled to a bottom surface of the first end region by the first retainer element and the second plug element is coupled to a bottom surface of the second end region by the second retainer element.

7. The system of claim 6, wherein the bottom housing component comprises a first chamber portion, a second chamber portion, and a central portion disposed between the first and second chamber portions, wherein the first chamber portion has a first chamber formed therein for seating a first actuation element and the second chamber portion has a second chamber formed therein for seating a second actuation element.

8. The system of claim 7, wherein the first actuation element has a first central cavity formed therein that is sized and configured for seating the first plug element and a first groove formed in a peripheral outer surface for seating a first sealing element, and wherein the second actuation element has a second central cavity formed therein that is sized and configured for seating the second plug element and a second groove formed in a peripheral outer surface for seating a second sealing element.

9. The system of claim 8, wherein the first plug element couples the first actuation element to the top housing component when the first plug element is disposed within the central cavity of the first actuation element, and wherein the second plug element couples the second actuation element to the top housing component when the second plug element is disposed within the central cavity of the second actuation element.

10. The system of claim 9, wherein each of the first and second chambers has an inner wall and a floor, and wherein the first sealing element of the first actuation element contacts the inner wall of the first chamber to form a fluid-tight seal between the first chamber and the first actuation element, and wherein the second sealing element of the second actuation element contacts the inner wall of the second chamber to form a fluid-tight seal between the second chamber and the second actuation element.

11. The system of claim 10, wherein each of the first and second chamber portions of the bottom housing component has a fluid port formed therein for receiving the pressurized fluid, such that when the pressurized fluid is introduced into the first and second chambers, the pressurized fluid moves the bottom housing component axially away from the top housing component and towards the gland element to apply the axial actuation force thereto.

12. The system of claim 4, wherein the gland bolt has a bolt shaft and a bolt head, and wherein the central region of the top housing component has a fastener-receiving aperture formed therein for receiving the bolt shaft and wherein the bolt head secures the external actuation subsystem to the gland element.

13. The system of claim 3, wherein the external actuation subsystem is movable between a preloaded position where the external actuation subsystem does not fully apply the axial actuation force to the gland element, and a loaded position where the external actuation subsystem applies the axial actuation force to the gland element.

14. The system of claim 3, wherein the external actuation subsystem is movable between a preloaded position where the bottom housing component does not fully apply the axial actuation force to the gland element, and a loaded position where the bottom housing component axially move away from the top housing component to apply the axial actuation force to the gland element.

15. The system of claim 2, wherein the external actuation subsystem is configured to move axially along the gland bolt and comprises a top housing component and a bottom housing component that are coupled together.

16. The system of claim 15, wherein the gland bolt has a bolt head and a bolt shaft, wherein the bottom housing component has a chamber formed therein having a sidewall and a floor, and wherein the floor portion of the chamber has a central opening formed therein for seating the bolt shaft and the bolt head is sized and configured seating within the chamber.

17. The system of claim 16, wherein the external actuation subsystem is movable along the bolt shaft between a preloaded position where the bolt head is disposed adjacent the floor of the bottom housing element and a loaded position where the bolt head is positioned adjacent the top housing component.

18. The system of claim 17, wherein the bolt head has a peripheral outer surface having a groove formed therein for seating a bolt sealing element, and wherein the bottom housing component is sized and configured such that the bolt sealing element is disposed in fluid sealing engagement with the sidewall of the chamber.

19. The system of claim 18, wherein the central opening of the floor portion of the chamber has a groove formed therein for seating a shaft sealing element, and wherein the shaft sealing element engages with the shaft of the gland bolt to form a fluid tight seal.

20. The system of claim 19, wherein the bottom housing element has a fluid port formed therein for communicating the pressurized fluid with the chamber for moving the external actuation subsystem between the preloaded and loaded positions.

21. The system of claim 20, wherein the bottom housing component has an anti-rotation element mounted on a bottom surface thereof for coupling to the gland element, wherein the anti-rotation element prevents rotation of the external actuation subsystem relative to the gland element during use.

* * * * *